US011969770B2

(12) United States Patent
Tugab et al.

(10) Patent No.: US 11,969,770 B2
(45) Date of Patent: Apr. 30, 2024

(54) ELECTRONIC DEVICE PERIPHERAL CLEANING CABINET

(71) Applicant: TEXAS INSTRUMENTS INCORPORATED, Dallas, TX (US)

(72) Inventors: Jesusa Teomarie Tugab, Baguio (PH); Gerald De Vera, Baguio (PH); Eugenio Villarico, Baguio (PH)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/736,476

(22) Filed: May 4, 2022

(65) Prior Publication Data

US 2023/0356268 A1 Nov. 9, 2023

(51) Int. Cl.
*B08B 13/00* (2006.01)
*B08B 5/02* (2006.01)

(52) U.S. Cl.
CPC ............ *B08B 5/02* (2013.01); *B08B 2205/00* (2013.01)

(58) Field of Classification Search
None
See application file for complete search history.

(56) References Cited

U.S. PATENT DOCUMENTS 2,490,344 A * 12/1949 Fisher ..................... A61L 2/204 246/270 R
3,021,972 A * 2/1962 Everroad ............... B01D 41/04 414/433
2021/0046520 A1* 2/2021 Collins ..................... F24F 3/16

OTHER PUBLICATIONS

"Internal Survey Results," unpublished, 1 page.

* cited by examiner

*Primary Examiner* — Eric W Golightly
(74) *Attorney, Agent, or Firm* — Andrew R. Ralston; Frank D. Cimino

(57) ABSTRACT

The present disclosure generally relates to an electronic device peripheral cleaning cabinet and a method for cleaning such peripherals. In an example, a peripheral cleaning cabinet includes a cabinet body, a door, a cabinet gas line, and a support shelf. The cabinet body includes an exhaust port. The door is mechanically coupled to the cabinet body. The cabinet gas line includes a gas valve and a nozzle. The gas valve is fluidly coupled to the nozzle. The nozzle is disposed in the cabinet body. The cabinet gas line is configured to supply a gas to flow into the cabinet body. The support shelf is disposed in the cabinet body and is configured to support a peripheral. The support shelf is configured to allow the gas to flow from the nozzle, through the support shelf, and to the exhaust port.

16 Claims, 16 Drawing Sheets

ELECTRONIC DEVICE PERIPHERAL CLEANING CABINET

BACKGROUND

Integrated circuits formed on semiconductor die are commonly packaged in semiconductor packages. Semiconductor packages usually encapsulate the integrated circuit in some material, such as a plastic, molding compound, or the like, to provide some degree of protection and mechanical support to the integrated circuit. The protection provided to the integrated circuit can be from chemicals and contaminants, from mechanical impact, and others. A semiconductor package generally will have external electrical leads, such as metal lands, metal balls, or metal pins, that are capable of electrically connecting the integrated circuit with some other component.

SUMMARY

This Summary is provided to introduce a brief selection of disclosed concepts in a simplified form that are further described below in the Detailed Description including the drawings provided. Various disclosed structures and methods may be beneficially applied to an electronic device peripheral cleaning cabinet and a method for cleaning such peripherals. While such implementations may be expected to remove contaminants from peripherals and any contents of the peripherals such that yield of packaged semiconductor devices may be increased, no particular result, advantage, or benefit is a requirement unless explicitly recited in a particular claim.

An example described herein is a peripheral cleaning cabinet. The peripheral cleaning cabinet includes a cabinet body, a door, a cabinet gas line, and a support shelf. The cabinet body includes an exhaust port. The door is mechanically coupled to the cabinet body. The cabinet gas line includes a gas valve and a nozzle. The gas valve is fluidly coupled to the nozzle. The nozzle is disposed in the cabinet body. The cabinet gas line is configured to supply a gas to flow into the cabinet body. The support shelf is disposed in the cabinet body and is configured to support a peripheral. The support shelf is configured to allow the gas to flow from the nozzle, through the support shelf, and to the exhaust port.

Another example is a method of cleaning. A gas is flowed through a cabinet in which a peripheral is disposed. The cabinet includes a cabinet body comprising an exhaust port; a nozzle disposed in the cabinet body; and a support shelf disposed in the cabinet body and configured to support the peripheral. The gas flows from the nozzle, through the support shelf, and to the exhaust port. At least some of the gas passes through the peripheral.

A further example is an electronic device peripheral cleaning cabinet. The electronic device peripheral cleaning cabinet includes a cabinet body; a door mechanically coupled to the cabinet body; a gas delivery means for supplying a gas to an interior space of the cabinet body; and a peripheral support means for supporting a peripheral in the interior space of the cabinet body.

The foregoing summary outlines rather broadly various features of examples of the present disclosure in order that the following Detailed Description may be better understood. Additional features and advantages of such examples will be described hereinafter. The described examples may be readily utilized as a basis for modifying or designing other examples that are within the scope of the appended claims.

BRIEF DESCRIPTION OF THE DRAWINGS

So that the manner in which the above recited features can be understood in detail, reference is made to the following Detailed Description taken in conjunction with the accompanying drawings.

Figure 1A:
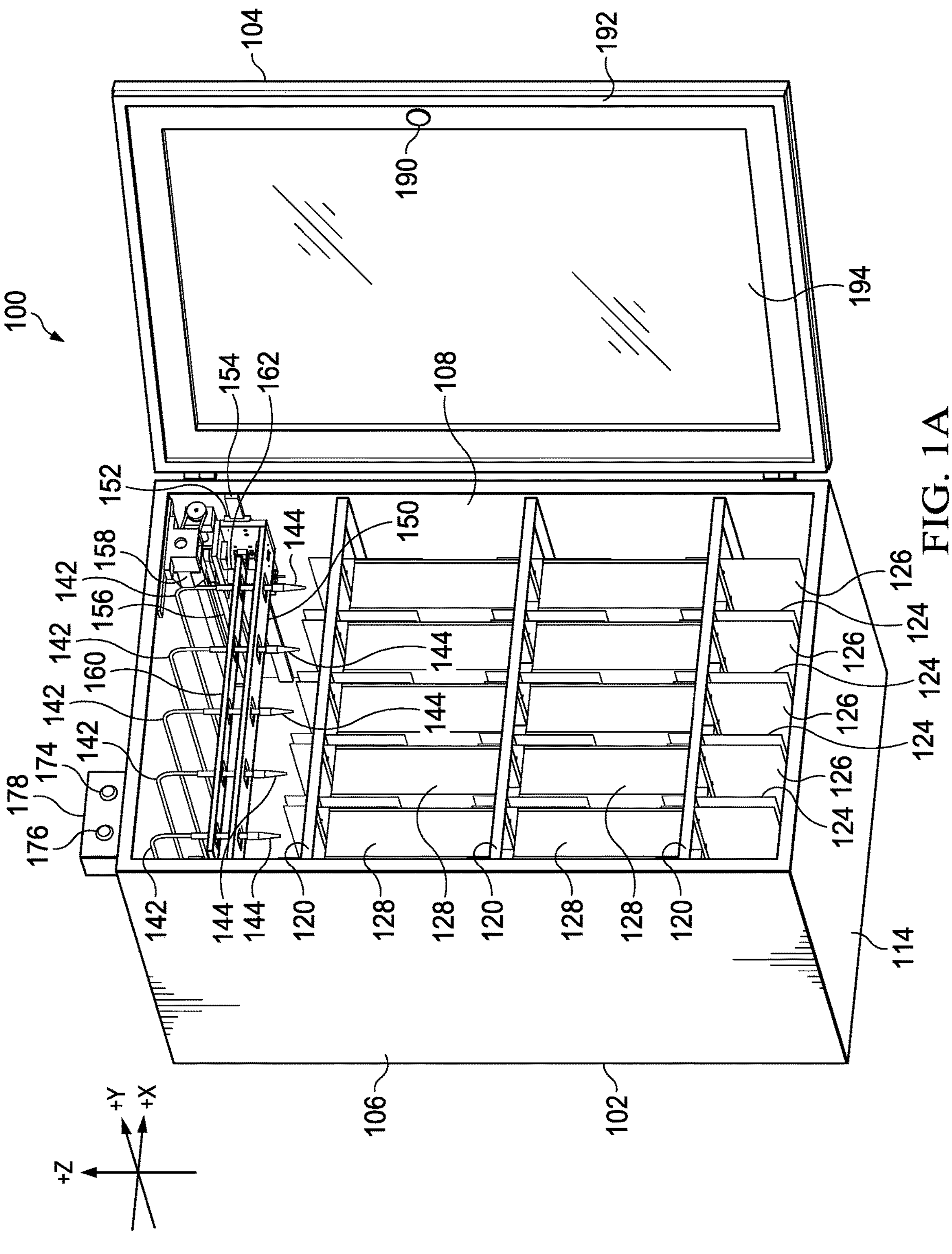
FIGS. 1A, 1B, and 1C are perspective views of an electronic device peripheral cleaning cabinet according to some examples.

The drawings, and accompanying detailed description, are provided for understanding of features of various examples and do not limit the scope of the appended claims. The examples illustrated in the drawings and described in the accompanying detailed description may be readily utilized as a basis for modifying or designing other examples that are within the scope of the appended claims. Identical reference numerals may be used, where possible, to designate identical elements that are common among drawings. The figures are drawn to clearly illustrate the relevant elements or features and are not necessarily drawn to scale.

DETAILED DESCRIPTION

Various features are described hereinafter with reference to the figures. An illustrated example may not have all the aspects or advantages shown. An aspect or an advantage described in conjunction with a particular example is not necessarily limited to that example and can be practiced in any other examples even if not so illustrated or if not so explicitly described. Various figures described below include a three-axis coordinate system for facilitating reference between the figures. Further, methods described herein may be described in a particular order of operations, but other methods according to other examples may be implemented in various other orders (e.g., including different serial or parallel performance of various operations) with more or fewer operations.

The present disclosure relates generally, but not exclusively, to an electronic device peripheral cleaning cabinet and a method for cleaning such peripherals. As described in detail below, an electronic device peripheral cleaning cabinet is configured to support one or more electronic device peripherals in an interior space of the electronic device peripheral cleaning cabinet. The electronic device peripheral cleaning cabinet is further configured to provide a flow of gas through the interior space of the electronic device peripheral cleaning cabinet. With the one or more electronic device peripherals being in the interior space, at least some of the gas may flow through the electronic device peripherals and around the contents (if any) of the peripherals. The gas flow through the peripherals can remove contaminants from the peripherals and from any contents of the peripherals, and is exhausted out of the interior space of the electronic device peripheral cleaning cabinet. Example electronic device peripherals include a magazine, a carrier, a flex frame, or another structure configured to house or support packaged semiconductor devices, e.g., integrated circuits. Example packaged semiconductor devices that a peripheral is configured to house or support include a plastic ball grid array (PBGA) package, a quad flat package (QFP), a small outline transistor (SOT) package, or any other packaged semiconductor device.

It has been observed that contaminants may be introduced to a packaged semiconductor device during packaging processing and/or by transportation of the packaged semiconductor device. The contaminants can be any foreign material, whether organic or inorganic. The contaminants can result in faulty semiconductor devices, which can result in yield losses. For example, the contaminants can cause a short circuit between external electrical leads of a packaged semiconductor device, which can damage the packaged semiconductor device or render the device inoperable when assembled in a finished product. Examples described herein provide for an electronic device peripheral cleaning cabinet and a method for cleaning such peripherals that are capable of cleaning the peripherals and any contents of the peripherals using gas flow. Cleaning in such a manner can remove the contaminants such that greater yield and lower inspection times can be realized. In some examples, one or more electronic device peripherals may contain or support one or more packaged semiconductor devices while the electronic device peripheral(s) are disposed in the electronic device peripheral cleaning cabinet being cleaned. In other examples, one or more electronic device peripherals may not contain or support any packaged semiconductor device while the electronic device peripheral(s) are disposed in the electronic device peripheral cleaning cabinet being cleaned. Other benefits may be achieved by various examples.

Figure 1B:
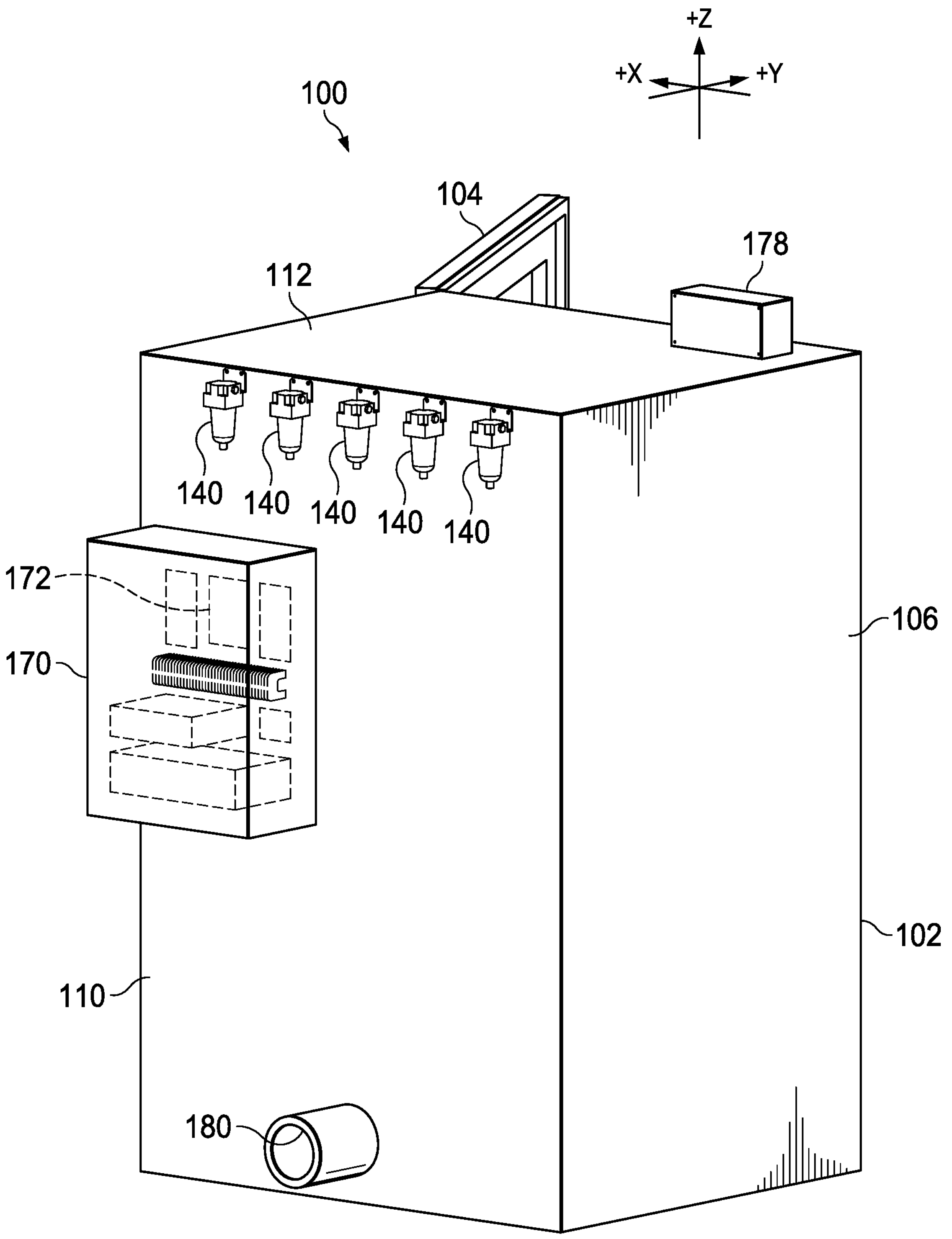
Figure 1C:
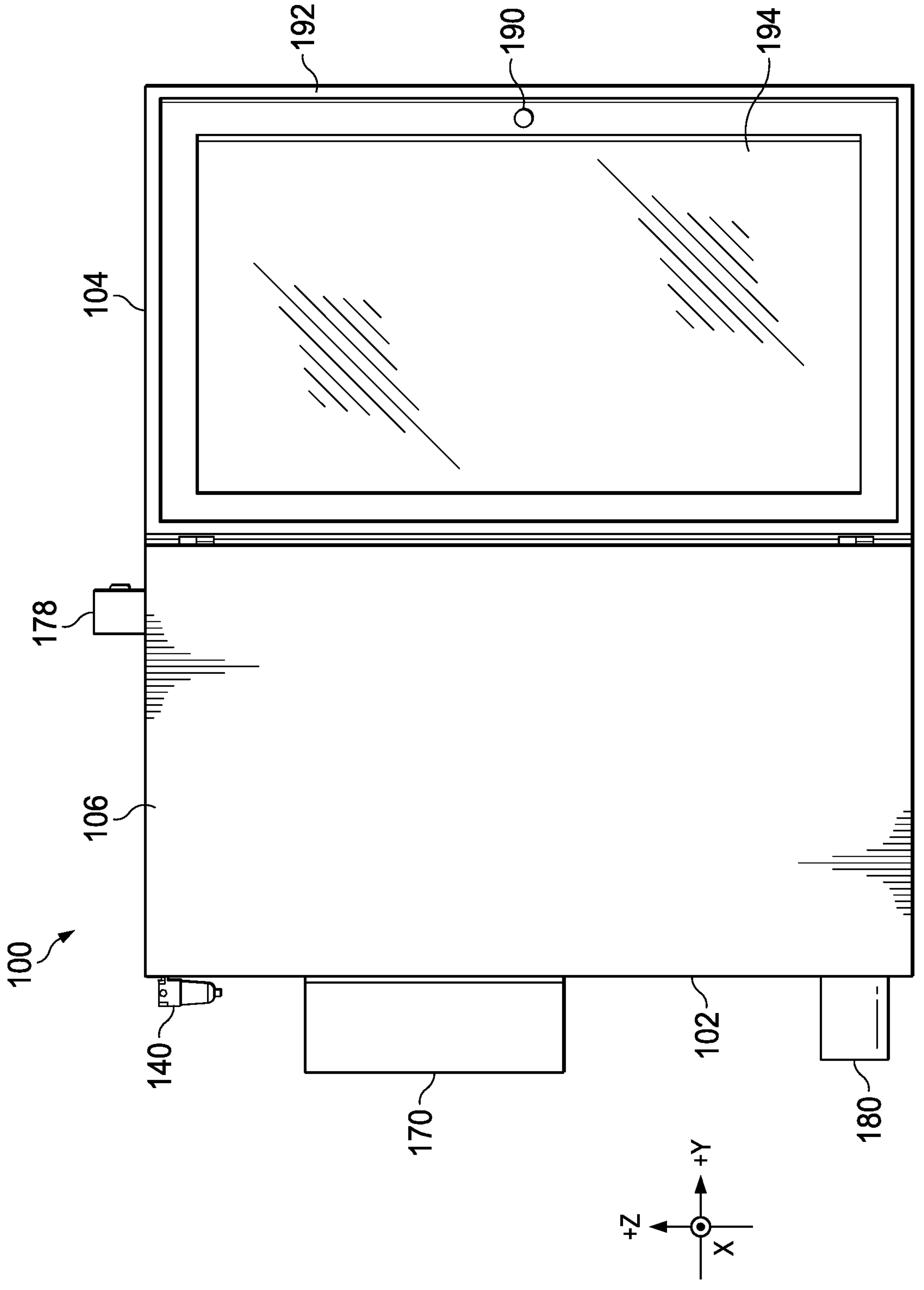

FIGS. 1A, 1B, and 1C are perspective views of an electronic device peripheral cleaning cabinet 100 according to some examples and are described concurrently. The peripheral cleaning cabinet 100 includes a cabinet body 102 and a cabinet door 104. The cabinet door 104 is mechanically coupled to the cabinet body 102, such as by being mechanically attached via hinges. Other doors and mechanical couplings can be implemented. The cabinet door 104 is configured to be in an open position and a closed position relative to the cabinet body 102, such as by swinging between the open position and the closed position by action of hinges.

The cabinet body 102 defines an interior space by lateral sidewalls 106, 108, back wall 110, ceiling 112, and floor 114 of the cabinet body 102. The interior space of the cabinet body 102 is an enclosed space in the peripheral cleaning cabinet 100 when the cabinet door 104 is in a closed position relative to the cabinet body 102. In FIGS. 1A, 1B, and 1C, the cabinet door 104 is in an open position relative to the cabinet body 102.

The peripheral cleaning cabinet 100 includes a peripheral support assembly disposed in the cabinet body 102 and configured to support one or more electronic device peripherals in the interior space of the cabinet body 102. The peripheral support assembly includes wall support shelves 120 and pairs of peripheral support walls 124, 126. Generally, each wall support shelf 120 extends between and is mechanically supported by the lateral sidewalls 106, 108. For each pair, the pair of peripheral support walls 124, 126 includes a peripheral support wall 124 and another peripheral support wall 126 that opposes the corresponding peripheral support wall 124 of the pair. The wall support shelf 120 is configured to support one or more pairs of peripheral support walls 124, 126. The example peripheral cleaning cabinet 100 of FIG. 1A includes three wall support shelves 120, and each wall support shelf 120 is shown supporting five pairs of peripheral support walls 124, 126. In this configuration, the peripheral support assembly is capable of simultaneously supporting up to thirty of the type of electronic device peripherals 128 illustrated. Additional details of the peripheral support assembly are illustrated in and described with respect to subsequent figures. The peripheral support assembly can include more or fewer wall support shelves, and each wall support shelf can support any number of pairs of peripheral support walls. Additionally, different configurations of a peripheral support assembly may be implemented.

The peripheral cleaning cabinet 100 includes a gas delivery assembly configured to supply a gas to the interior space of the cabinet body 102. The gas delivery assembly includes pneumatic filters 140, hoses 142, and nozzles 144. Each pneumatic filter 140 includes a gas valve and a gas filter. For convenience with respect to the illustrated example, a cabinet gas line includes one pneumatic filter 140 and one nozzle 144 with one or more hoses 142 fluidly coupled therebetween. For a cabinet gas line, the pneumatic filter 140 has an outlet port fluidly coupled to a hose 142, and the hose 142 is fluidly coupled to the nozzle 144.

In the illustrated example, the pneumatic filters 140 are mechanically mounted on an exterior of the cabinet body 102 (e.g., on the back wall 110), and in other examples, the pneumatic filters 140 may be disposed in the interior space of the cabinet body 102. In the illustrated example, for a cabinet gas line, the hose 142 may serve as an inlet port to the interior space of the cabinet body 102, or an inlet port of the cabinet body 102 (e.g., separate from the pneumatic filter 140 and hose 142 and to which the pneumatic filter 140 and hose 142 are coupled) may be integral to the cabinet body 102. Hence, the outlet port of the pneumatic filter 140 in the illustrated example is fluidly coupled to the inlet port of the cabinet body 102. In examples where the pneumatic filter 140 is disposed in the interior space of the cabinet body 102, the cabinet body 102 may have an inlet port, which may be integral to the cabinet body 102, that is fluidly coupled to an inlet port of the pneumatic filter 140, and an outlet port of the pneumatic filter 140 can be fluidly coupled to the hose 142.

The example peripheral cleaning cabinet 100 of FIG. 1A includes five cabinet gas lines. Additional details of the gas delivery assembly are illustrated in and described with respect to subsequent figures. The gas delivery assembly can include more or fewer cabinet gas lines. Additionally, different configurations of a gas delivery assembly may be implemented.

The peripheral cleaning cabinet 100 includes a nozzle movement assembly configured to move the nozzles 144 within the interior space of the cabinet body 102. The nozzle movement assembly is configured to move the nozzles 144 by translation along a y-direction and by angular movement (e.g., rotation) around a respective y-axis (e.g., in a sweeping motion).

The nozzle movement assembly includes a nozzle support plate 150, guides 152, tracks 154, a follower, a link screw 156, and a motor 158. (The follower is occluded in FIGS. 1A, 1B, and 1C, but is visible as follower 910 in FIG. 9.) Generally, the nozzle support plate 150 is configured to support the nozzles 144. The nozzle support plate 150 is mechanically attached to first and second translation support brackets (not numbered). Additionally, one or more of the guides 152 are mechanically attached to each of the first and second translation support brackets. The guides 152 engage a respective track 154 that permit the guides 152 to be translated along the tracks 154.

The follower is mechanically attached to the first translation support bracket. The follower is threadedly engaged with the link screw 156. The link screw 156 is mechanically coupled to the cabinet body 102 (e.g., to the sidewall 108) via a fixed support bracket and bearings. The link screw 156 is configured to rotate around a longitudinal axis of the link screw 156 (e.g., within the fixed support bracket and with the bearings). The motor 158 is mechanically coupled to the cabinet body 102 (e.g., to the ceiling 112) via another fixed support bracket. The drive shaft of the motor 158 is rotationally coupled to the link screw 156. In the illustrated example, the drive shaft of the motor 158 is rotationally coupled to the link screw 156 via pulleys and a belt. In other examples, the drive shaft of the motor 158 can be directly mechanically attached to the link screw 156 (e.g., such that the respective longitudinal axes of the drive shaft and the link screw 156 align). In other examples, the drive shaft of the motor 158 can be rotationally coupled to the link screw 156 by gears.

In operation, the motor 158 rotates its drive shaft, which causes the link screw 156 to rotate. The motor 158 is capable of rotating its drive shaft in a clockwise direction and a counter-clockwise direction (e.g., an alternating current (AC) motor). Rotation of the link screw 156 causes the follower to be translated along a y-direction, which further causes the nozzle support plate 150, and hence, the nozzles 144, to be translated along a y-direction (e.g., front to back, or vice versa). The guide 152 and track 154 can passively guide the translation of the nozzle support plate 150 and can provide additional mechanical support.

The nozzle movement assembly further includes a shaker bridge 160, a slider-crank linkage, and a motor 162. The shaker bridge 160 is mechanically coupled to the nozzles 144 and extends parallel to the nozzle support plate 150. The shaker bridge 160 has a slider track that is mechanically coupled to a slider of the slider-crank linkage.

The motor 162 is mechanically coupled to the first translation support bracket. The drive shaft of the motor 162 is rotationally coupled to an offset shaft of the slider-crank linkage. In the illustrated example, the drive shaft of the motor 162 is rotationally coupled to the offset shaft of the slider-crank linkage via pulleys and a belt. In other examples, the drive shaft of the motor 162 can be directly mechanically attached to the offset shaft. In other examples the drive shaft of the motor 162 can be rotationally coupled to the offset shaft of the slider-crank linkage by gears.

In operation, the motor 162 rotates its drive shaft, which causes the offset shaft of the slider-crank linkage to rotate. Rotation of the offset shaft includes an x-direction component and a y-direction component. The slider of the slider-crank linkage and the slider track allow the rotation of the offset shaft to occur without substantial y-direction translation of the shaker bridge 160. The x-direction component of the rotation of the offset shaft is provided to the shaker bridge 160, via the slider-crank linkage, to translate the shaker bridge 160 along an x-direction. Due to the mechanical coupling of the nozzles 144 to the nozzle support plate 150 and to the x-direction translation of the shaker bridge 160, each nozzle 144 is rotated angularly around a respective y-axis that intersects the coupling the respective nozzle 144 to the nozzle support plate 150.

Additional details of the nozzle movement assembly are illustrated in and described with respect to subsequent figures. The nozzle movement assembly can implement fewer or more directions of movement of the nozzles 144 or any permutation of directions thereof. Additionally, different configurations of a nozzle movement assembly may be implemented to effectuate similar movement or different movement of the nozzles.

The peripheral cleaning cabinet 100 includes a control system. Many of the components of the control system may be housed in a control housing 170. The control system can include any appropriate power supply, power converter(s), motor driver(s), electrical terminal blocks, input/output board(s), the like, or a combination thereof. The control system includes a controller 172 and an on-switch 174. In the illustrated example, the control system further includes an off-switch 176. The on-switch 174 and the off-switch 176 are in a switch housing 178 disposed on the exterior of the cabinet body 102. The controller 172 can include one or more processors and memory (e.g., a non-transitory storage medium for storing instruction code) and is configured to control operation of the peripheral cleaning cabinet 100. For example, the controller 172 can receive a signal from the on-switch 174 to initiate a cleaning procedure. The controller 172 can then start the cleaning procedure by causing the gas valves of the pneumatic filters 140 to open and to cause the motors 158, 162 to operate thereby causing the nozzles 144 to move. Further, the controller 172 can end the cleaning procedure after a set duration of time has elapsed or when a signal from the off-switch 176 is received. The controller 172 can end the cleaning procedure by causing the gas valves of the pneumatic filters 140 to close and by causing the motors 158, 162 to cease operation.

The cabinet body 102 further has an exhaust port 180. Gas flowing through the interior space of the cabinet body 102 can be exhausted through the exhaust port 180, along with any contaminants removed from an electronic device peripheral as a result of the flowing of the gas.

The cabinet door 104 includes a latch 190, a gasket 192, and a window 194. The latch 190 permits the cabinet door 104 to be secured in the closed position relative to the cabinet body 102. The gasket 192 permits a substantially air-tight seal to be formed between the cabinet body 102 and the cabinet door 104 when the cabinet door 104 is in the closed position. The window 194 in the cabinet door 104 permits, e.g., an operator to visually observe contents of the peripheral cleaning cabinet 100 when the cabinet door 104 is in the closed position.

Figure 2:
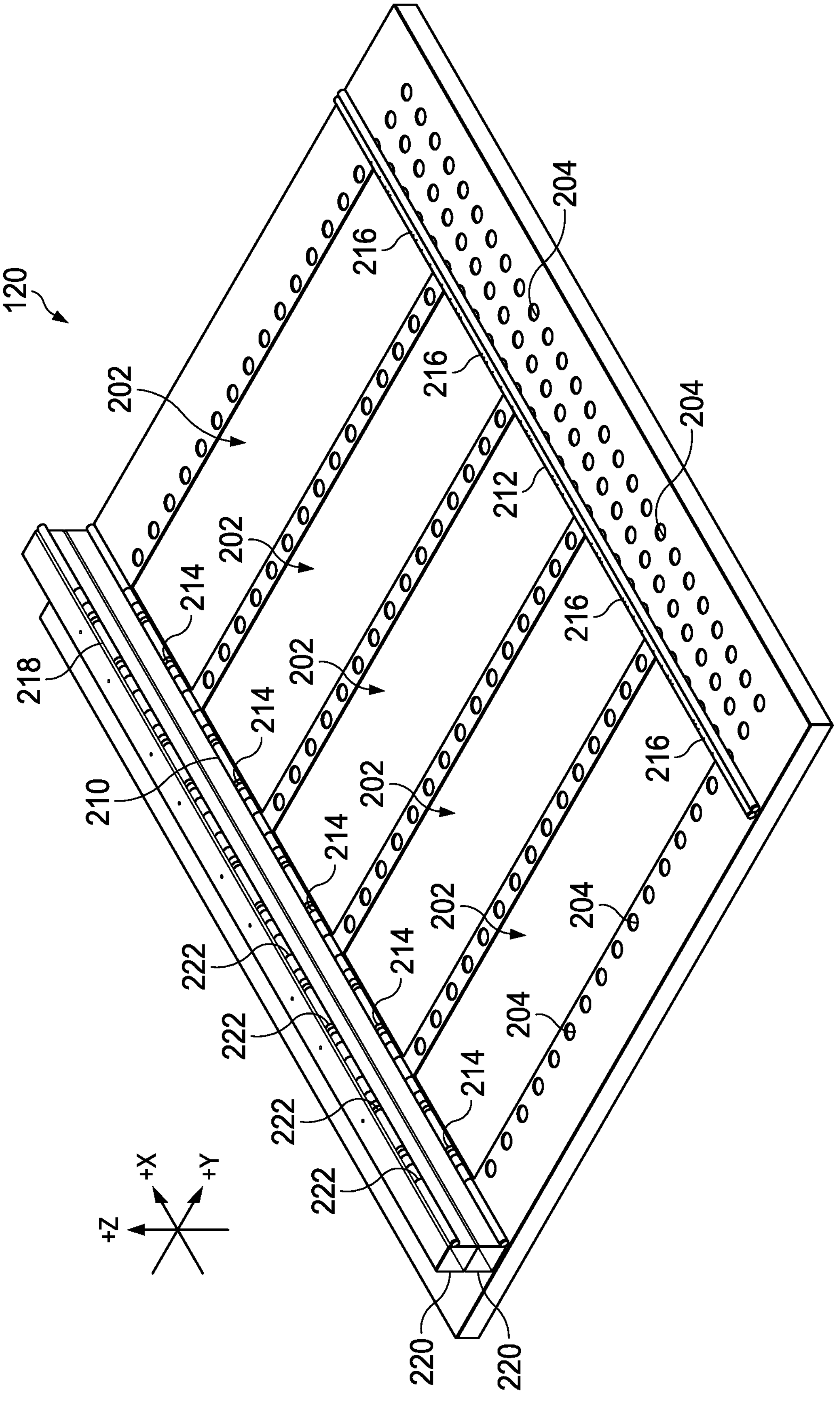
FIG. 2 is a perspective view of a wall support shelf according to some examples.

FIG. 2 is a perspective view of a wall support shelf 120 according to some examples. The wall support shelf 120 has wall insertion openings 202 and gas flow openings 204. A wall insertion opening 202 is configured to have a pair of peripheral support walls 124, 126 inserted therethrough. Further, gas may flow through a wall insertion opening 202 through an electronic device peripheral. Gas flow openings 204 permit gas flowing through the interior space of the cabinet body 102 and outside of an electronic device peripheral to pass through the wall support shelf 120.

A first stabilizing rail 210 is disposed on an upper surface of the wall support shelf 120 along respective sides of the wall insertion openings 202. A second stabilizing rail 212 is disposed on the upper surface of the wall support shelf 120 along respective sides of the wall insertion openings 202 opposite from the first stabilizing rail 210. The first stabilizing rail 210 and the second stabilizing rail 212 have first stabilizing slots 214 and second stabilizing slots 216, respectively, facing and proximate the wall insertion openings 202 that are configured to laterally stabilize respective pairs of peripheral support walls 124, 126, as will be detailed subsequently.

A third stabilizing rail 218 is disposed aligned vertically (e.g., in a z-direction) with the first stabilizing rail 210 and some distance away from the first stabilizing rail 210 (e.g., distal from the upper surface of the wall support shelf 120 on which the first stabilizing rail 210 is disposed). Stacked bars 220 disposed on the upper surface of the wall support shelf 120 are implemented to provide this distance, and the third stabilizing rail 218 is mechanically attached to the upper bar 220. The third stabilizing rail 218 has third stabilizing slots 222 facing and proximate the wall insertion openings 202 and vertically aligned with respective first stabilizing slots 214 of the first stabilizing rail 210. The third stabilizing slots 222 are configured to laterally stabilize respective pairs of peripheral support walls 124, 126, as will be detailed subsequently.

Figure 3A:
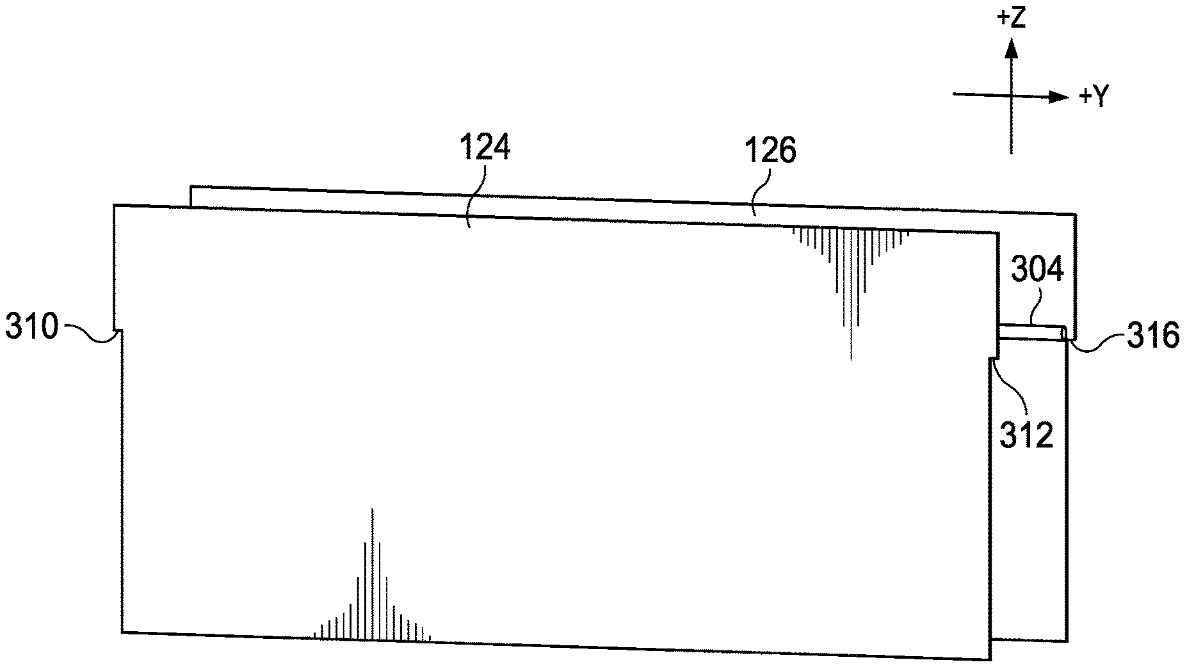
FIGS. 3A and 3B are perspective views of a pair of peripheral support walls according to some examples.
Figure 3B:
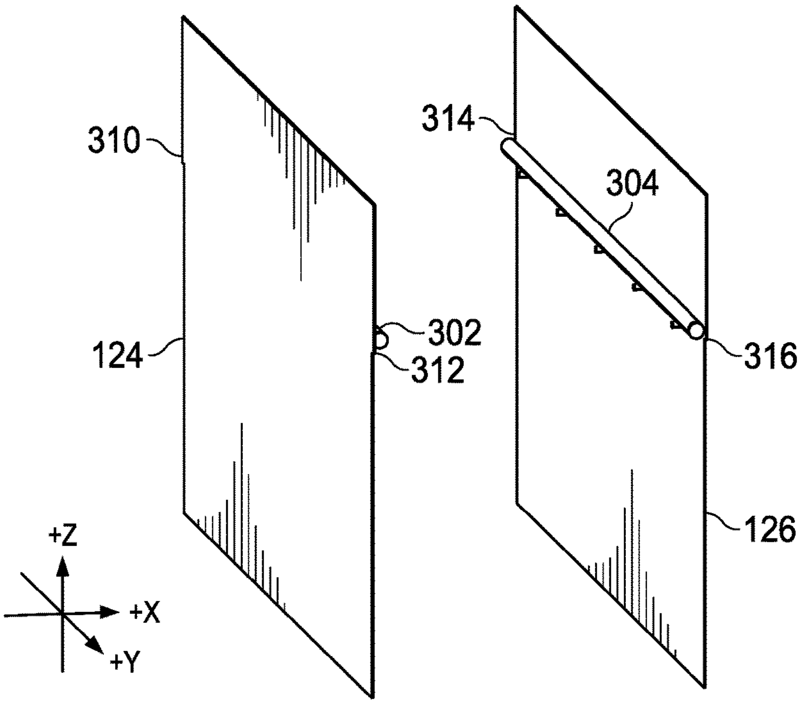

FIGS. 3A and 3B are perspective views of a pair of peripheral support walls 124, 126 according to some examples. Each peripheral support wall 124, 126 has a support rail 302, 304, respectively, disposed along and mechanically attached to a side surface of the respective peripheral support wall 124, 126. The support rails 302, 304 extend longitudinally along respective y-directions. The support rail 302 is disposed on the side surface of the peripheral support wall 124 that faces the peripheral support wall 126, and the support rail 304 is disposed on the side surface of the peripheral support wall 126 that faces the peripheral support wall 124. The support rails 302, 304 are configured to support an electronic device peripheral in the cabinet body 102.

The peripheral support wall 124 has laterally extending flanges 310, 312 on opposing lateral sides of the peripheral support wall 124 (e.g., extending oppositely along a y-direction). Similarly, the peripheral support wall 126 has laterally extending flanges 314, 316 on opposing lateral sides of the peripheral support wall 126 (e.g., extending oppositely along a y-direction). The flanges 310-316 are configured to be supported by the upper surface of the wall support shelf 120 and inserted into respective first stabilizing slots 214, second stabilizing slots 216, and third stabilizing slots 222 of the first stabilizing rail 210, second stabilizing rail 212, and third stabilizing rail 218, respectively. The wall support shelf 120 may support the pair of peripheral support walls 124, 126 while being laterally stabilized by the stabilizing slots 214, 216, 222, as detailed subsequently.

Figure 4:
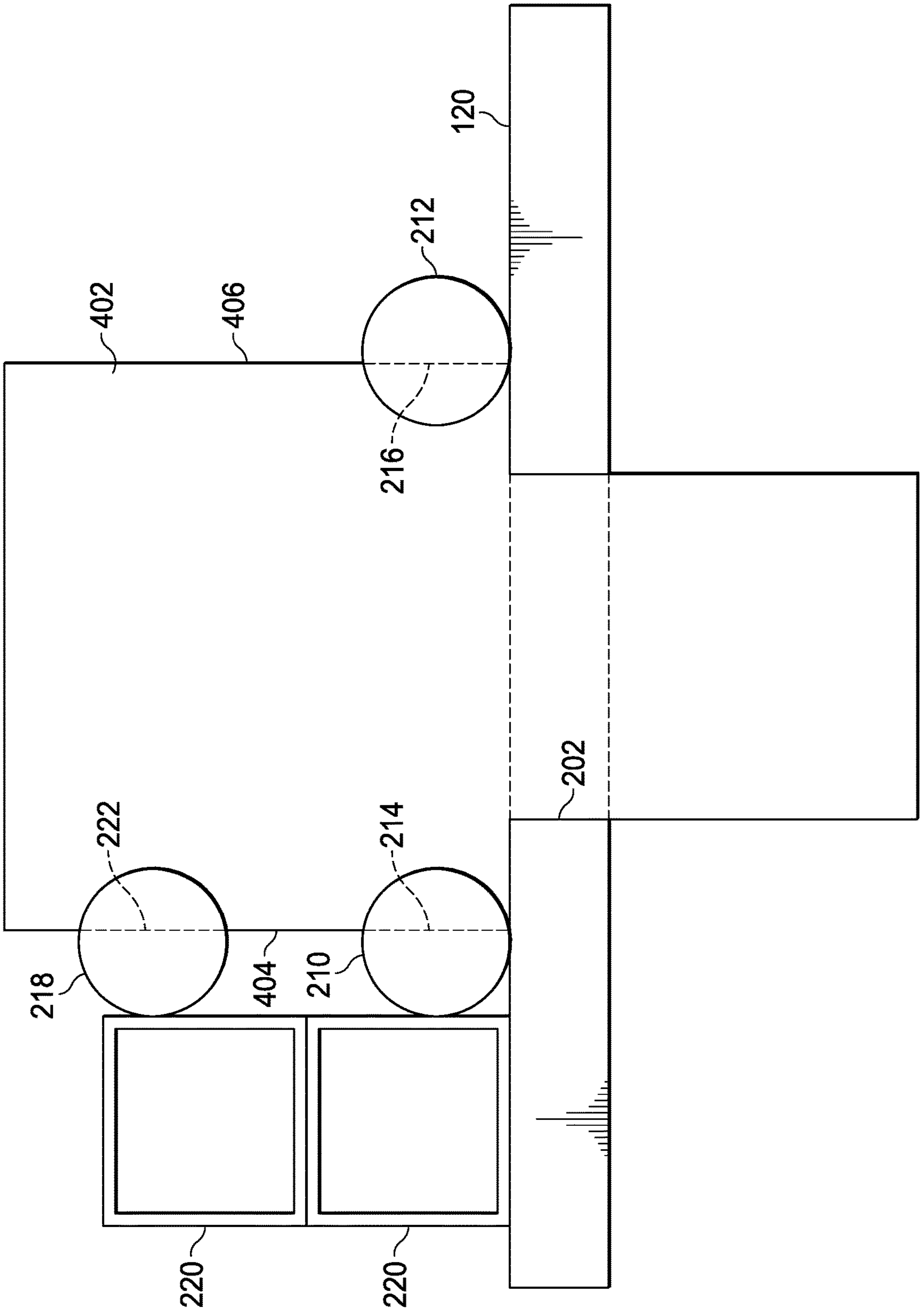
FIG. 4 is a simplified diagram of a peripheral support wall being supported by first and second support rails and a stabilizing rail according to some examples.

FIG. 4 is a simplified diagram of a peripheral support wall 402 being supported by the wall support shelf 120 according to some examples. The peripheral support wall 402 simplistically represents the peripheral support walls 124, 126. The peripheral support wall 402 has a flange 404 (e.g., like flanges 310, 314) and another flange 406 (e.g., like flanges 312, 316). When the peripheral support wall 402 is positioned through a wall insertion opening 202 (shown by dashed lines), the flange 404 is configured to be inserted in and engage a first stabilizing slot 214 of the first stabilizing rail 210 and a third stabilizing slot 222 of the third stabilizing rail 218, and the flange 406 is configured to be inserted in and engage a second stabilizing slot 216 of the second stabilizing rail 212. In this position, the flanges 404, 406 contact and are supported by the upper surface of the wall support shelf 120.

In this example, the first stabilizing slot 214, the second stabilizing slot 216, and the third stabilizing slot 222 are or approximate half-cut slots in the first stabilizing rail 210, the second stabilizing rail 212, and the third stabilizing rail 218, respectively. Hence, respective bottom surfaces of the flanges 404, 406 can contact and be supported by the upper surface of the wall support shelf 120. In this example, the first stabilizing slot 214, the second stabilizing slot 216, and the third stabilizing slot 222 do not support weight of the peripheral support wall 402 but may facilitate restriction of lateral movement of the peripheral support wall 402. In other examples, similar slots may support weight of a peripheral support wall 402.

Figure 5:
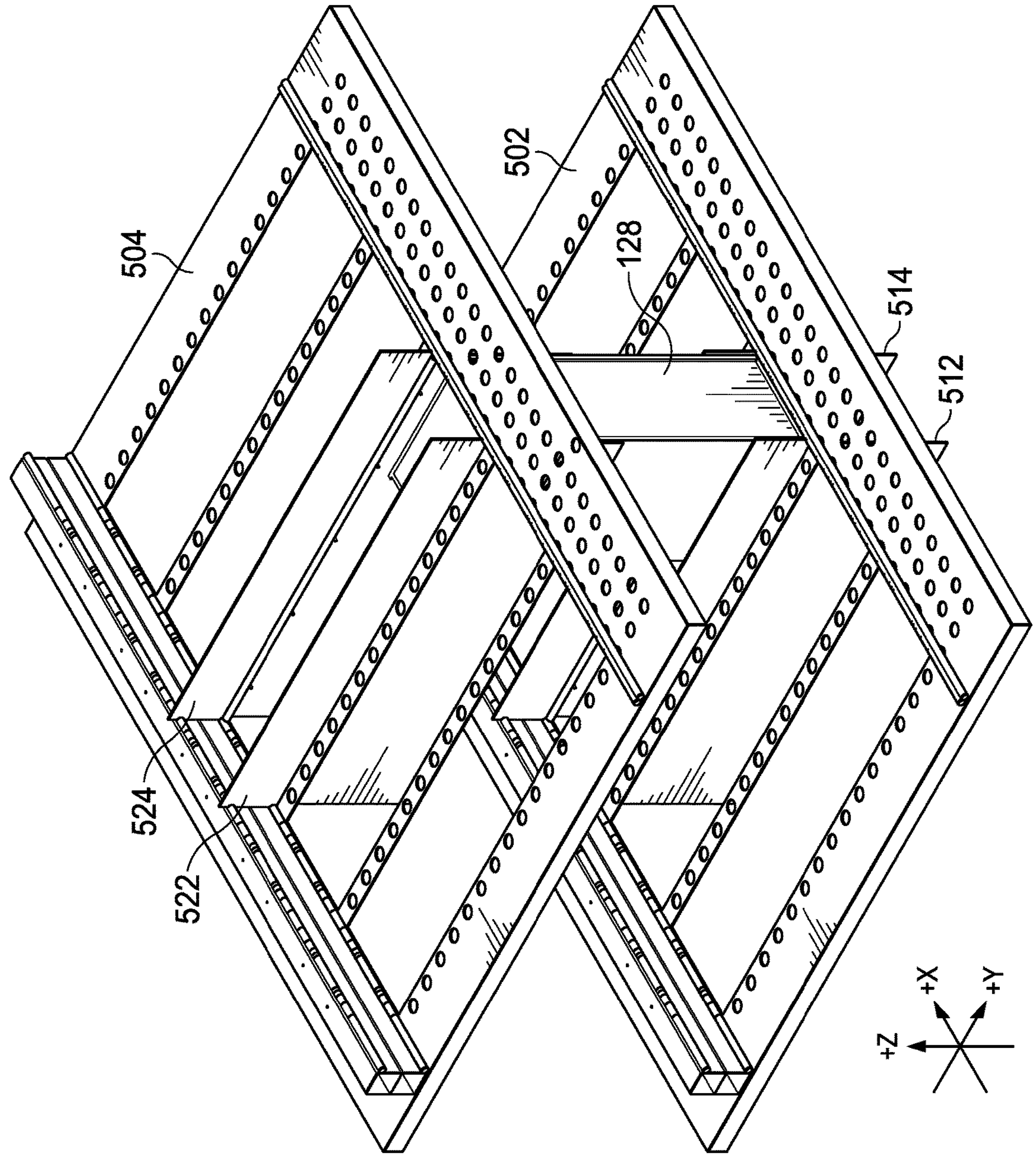
FIG. 5 is a perspective view of wall support shelves and peripheral support walls supporting an electronic device peripheral according to some examples.

FIG. 5 is a perspective view of wall support shelves and peripheral support walls supporting an electronic device peripheral 128 according to some examples. FIG. 5 shows a lower wall support shelf 502 and an upper wall support shelf 504. Each of the wall support shelves 502, 504 are like the wall support shelf 120 described previously. A lower pair of peripheral support walls 512, 514 are positioned in a wall insertion opening 202 of the lower wall support shelf 502, and an upper pair of peripheral support walls 522, 524 are positioned in a wall insertion opening 202 of the upper wall support shelf 504. The pairs of peripheral support walls 512, 514, 522, 524 are like the pair of peripheral support walls 124, 126 described previously.

The electronic device peripheral 128 is supported by support rails (e.g., support rails 302, 304) of the lower pair of peripheral support walls 512, 514. Respective upper portions of the lower pair of peripheral support walls 512, 514 and respective lower portions of the upper pair of peripheral support walls 522, 524 may restrict lateral movement in x-directions of the electronic device peripheral 128 while the electronic device peripheral 128 is supported by the support rails of the lower pair of peripheral support walls 512, 514.

In the orientation shown in FIG. 5, the electronic device peripheral 128 is open at the top and the bottom (e.g., planes normal to a z-direction). Hence, gas flowing through the cabinet body 102 is capable of flowing through the electronic device peripheral 128. Gas flowing through, over, and/or around the electronic device peripheral 128 is capable of removing contaminants from the electronic device peripheral 128 and any contents of the electronic device peripheral 128. Other gas that does not flow through an electronic device peripheral 128 may pass through other openings, such as gas flow openings 204 (FIG. 2), and/or through the wall support shelves 502, 504 (e.g., wall support shelves 120).

As shown in FIG. 2, the first stabilizing rail 210, second stabilizing rail 212, and third stabilizing rail 218 have multiple first stabilizing slots 214, multiple second stabilizing slots 216, and multiple third stabilizing slots 222, respectively, for each wall insertion opening 202. These multiple slots permit one or both peripheral support walls 124, 126 to be positioned through the respective wall insertion opening 202 at different distances from each other. Positioning the peripheral support walls 124, 126 at different distances from each other within the respective wall insertion opening 202 permits the peripheral cleaning cabinet 100 to accommodate and support electronic device peripherals of different sizes.

Figure 6:
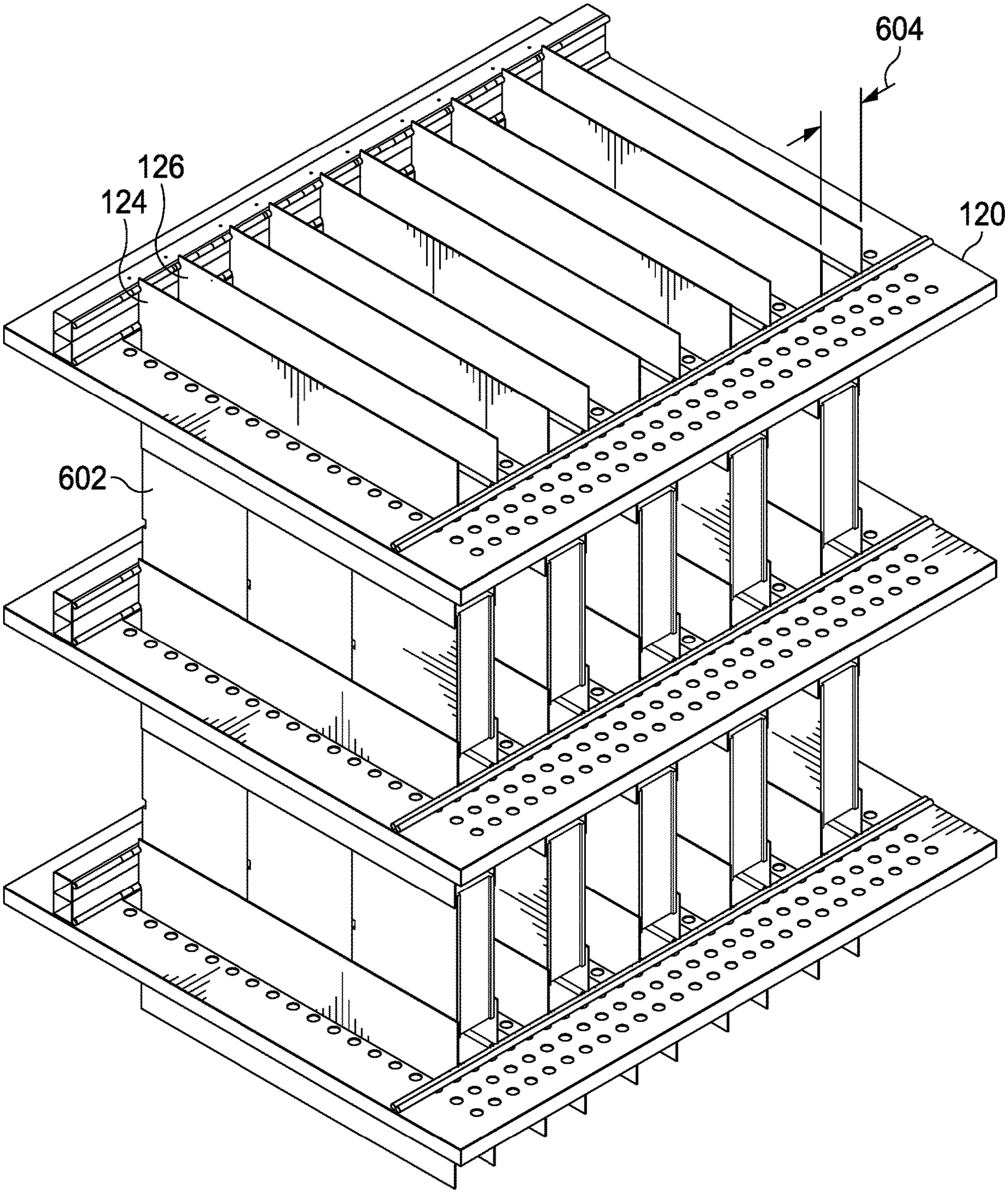
FIGS. 6, 7, and 8 are perspective views in which peripheral support walls are positioned differently to accommodate different electronic device peripherals according to some examples.
Figure 7:
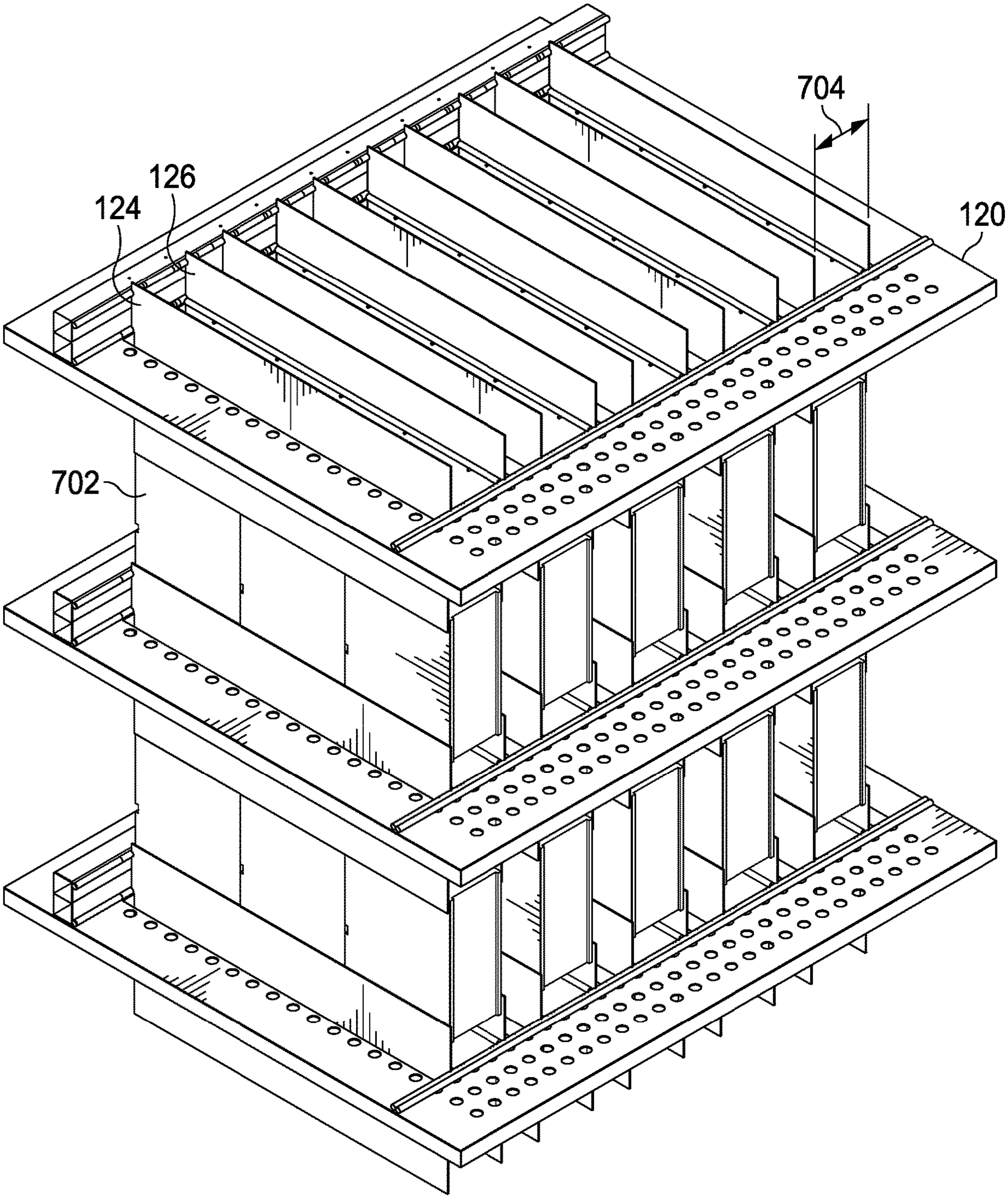
Figure 8:
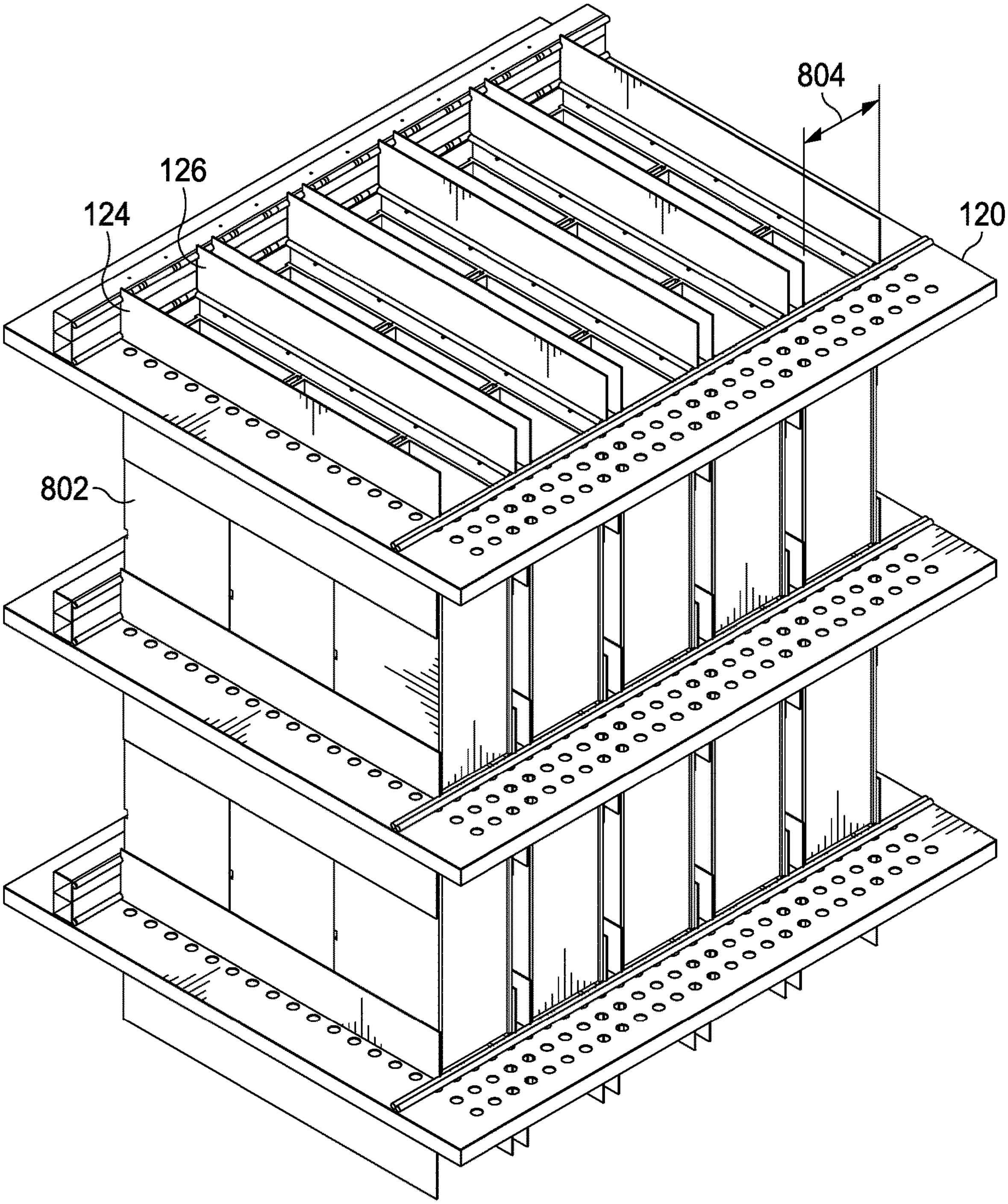

FIGS. 6, 7, and 8 are perspective views in which peripheral support walls 124, 126 are positioned differently to accommodate different electronic device peripherals according to some examples. FIG. 6 shows peripheral support walls 124, 126 positioned to accommodate electronic device peripherals 602, where a pair of the peripheral support walls 124, 126 is positioned at a distance 604 from each other. FIG. 7 shows peripheral support walls 124, 126 positioned to accommodate electronic device peripherals 702, where a pair of the peripheral support walls 124, 126 is positioned at a distance 704 from each other. FIG. 8 shows peripheral support walls 124, 126 positioned to accommodate electronic device peripherals 802, where a pair of the peripheral support walls 124, 126 is positioned at a distance 804 from each other. The electronic device peripherals 602, as an example, may each be a magazine configured to contain and/or containing PBGA packages; the electronic device peripherals 702, as an example, may each be a QFP magazine; and electronic device peripherals 802, as an example, may each be a SOT magazine. The distance 704 is greater than the distance 604, and the distance 804 is greater than the distance 704.

Figure 9:
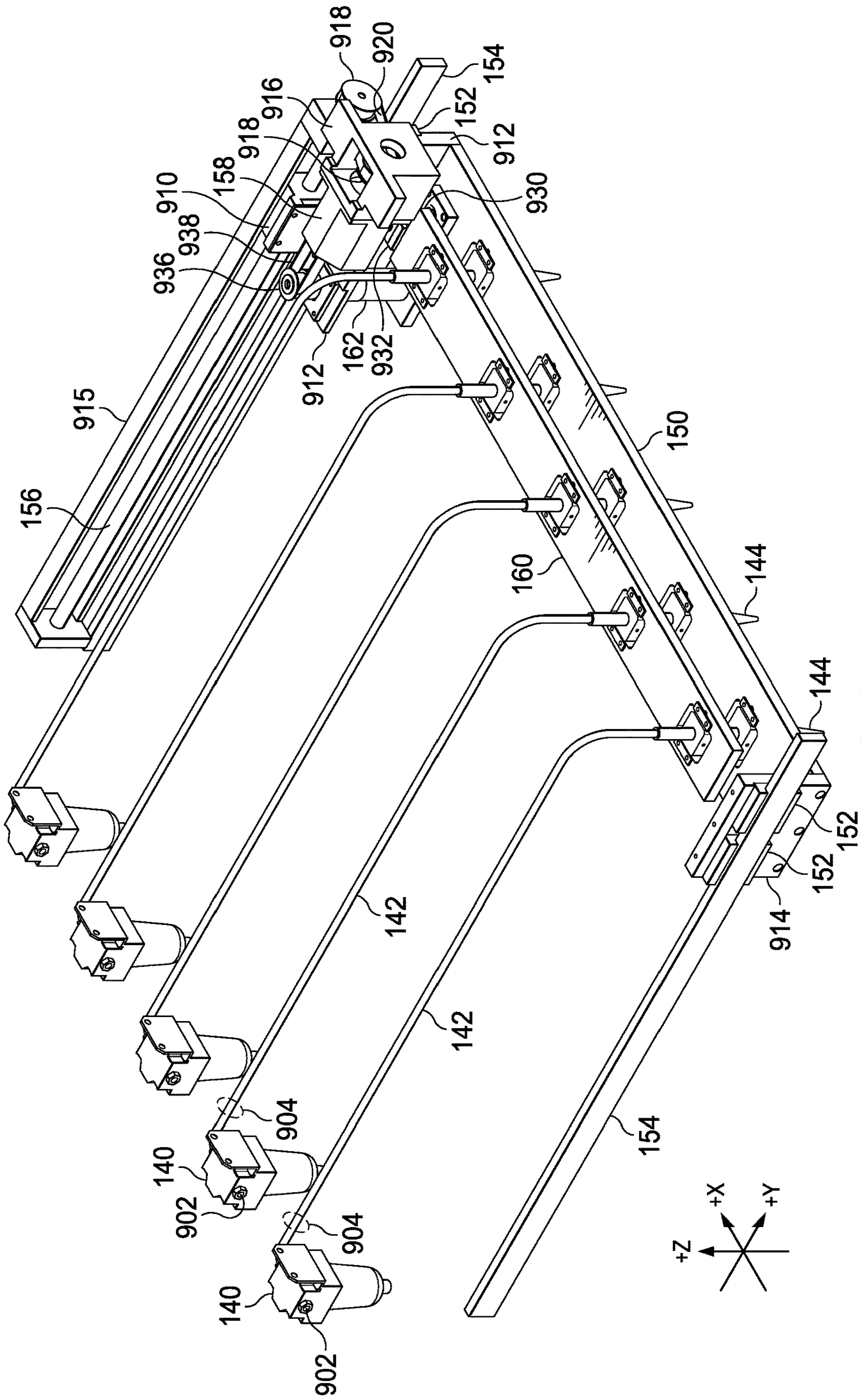
FIG. 9 is a perspective view showing the gas delivery assembly and the nozzle movement assembly of the electronic device peripheral cleaning cabinet according to some examples.
Figure 10:
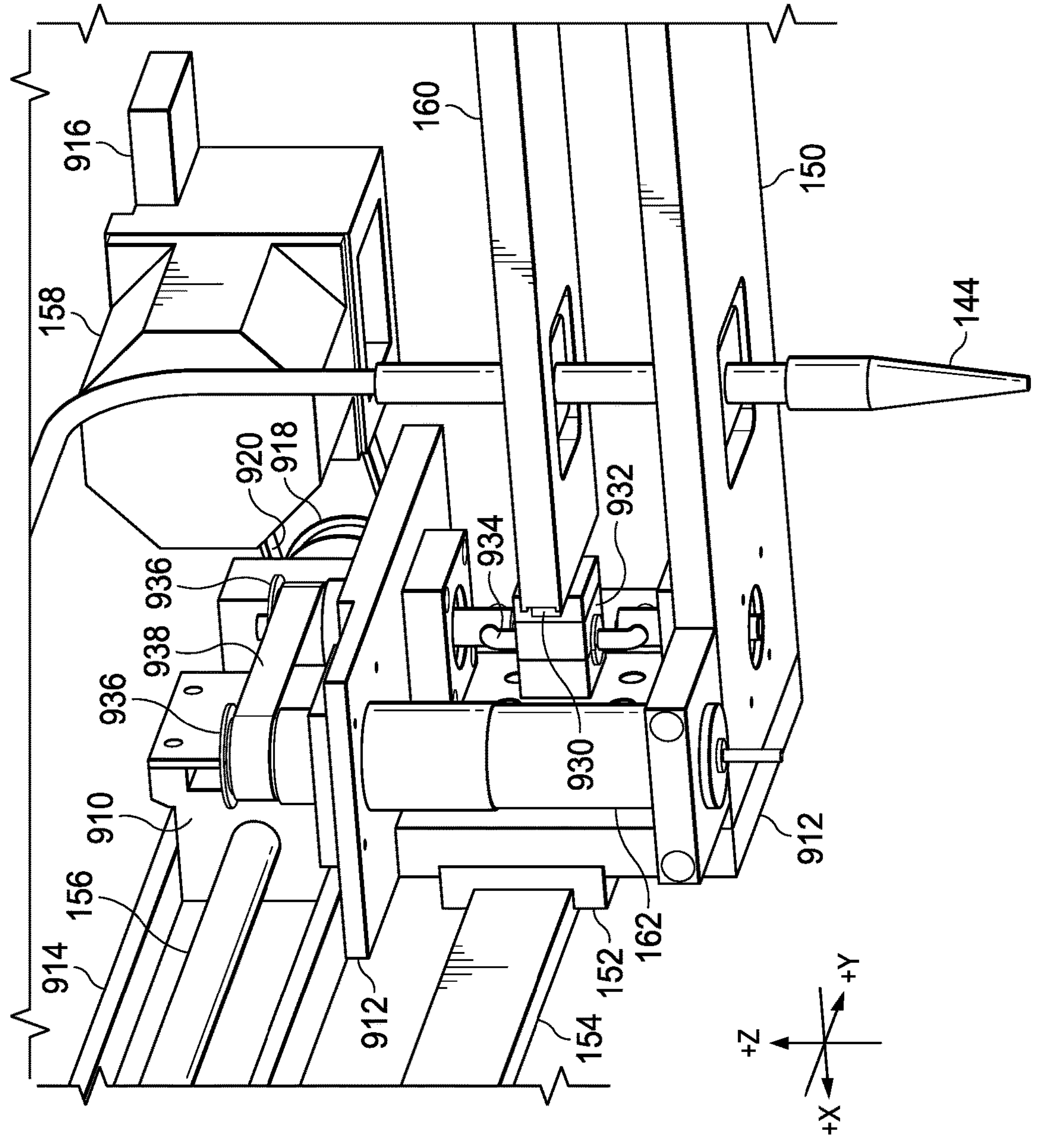
FIG. 10 is a perspective view showing a portion of the nozzle movement assembly of the electronic device peripheral cleaning cabinet according to some examples.

FIG. 9 is a perspective view showing the gas delivery assembly and the nozzle movement assembly of the electronic device peripheral cleaning cabinet 100 according to some examples. FIG. 10 is a perspective view showing a portion of the nozzle movement assembly of the electronic device peripheral cleaning cabinet 100 according to some examples.

As described previously, in the gas delivery assembly a cabinet gas line includes a pneumatic filter 140 and a nozzle 144 with one or more hoses 142 fluidly coupled therebetween. In the illustrated example, each pneumatic filter 140 has an inlet port 902 that is configured to be fluidly coupled to a facility gas supply, and each pneumatic filter 140 has an outlet port that is fluidly coupled to a respective inlet port 904 of the cabinet body 102, which is further fluidly coupled to a respective hose 142. In other examples, where the pneumatic filters 140 are disposed in the cabinet body 102, an inlet port of each pneumatic filter 140 can be fluidly coupled to an inlet port of the cabinet body 102, and an outlet port of each pneumatic filter 140 can be fluidly coupled to a respective hose 142.

The nozzle movement assembly includes a nozzle support plate 150, guides 152, tracks 154, a follower 910, a link screw 156, and a motor 158. The nozzle support plate 150 is mechanically attached to and between a first translation support bracket 912 and a second translation support bracket 914. Guides 152 are attached to each of the first translation support bracket 912 and the second translation support bracket 914, and the guides 152 engage a respective track 154. The tracks 154 can support the nozzle support plate 150 and components attached to and supported by the nozzle support plate 150 and can permit movement of the nozzle support plate 150 by the guides 152 sliding along the track 154 along a y-direction. Additionally, the follower 910 is mechanically attached to the first translation support bracket 912. The follower 910 is threadedly engaged with the link screw 156.

The link screw 156 is mechanically coupled to the cabinet body 102 (e.g., to the sidewall 108) via a fixed support bracket 915 and bearings. The motor 158 is mechanically coupled to the cabinet body 102 (e.g., to the ceiling 112) via another fixed support bracket 916. The drive shaft of the motor 158 is rotationally coupled to the link screw 156 via pulleys 918 and a belt 920 in this example.

The nozzle movement assembly further includes a shaker bridge 160, a slider-crank linkage, and a motor 162. The shaker bridge 160 is mechanically coupled to the nozzles 144 and extends parallel to the nozzle support plate 150. The shaker bridge 160 has a slider track 930 at a lateral end of the shaker bridge 160. The slider-crank linkage includes a slider block 932 that includes a slider that engages the slider track 930 on the shaker bridge 160. The slider of the slider block 932 is configured to slide along the slider track 930 in a y-direction. The slider-crank linkage includes an offset shaft 934 mechanically coupled between the nozzle support plate 150 and the first translation support bracket 912. The slider block 932 is mechanically coupled (e.g., with a bearing) to the offset shaft 934. The motor 162 is mechanically coupled to the first translation support bracket 912. The drive shaft of the motor 162 is rotationally coupled to the offset shaft 934 of the slider-crank linkage via pulleys 936 and a belt 938.

Figure 11:
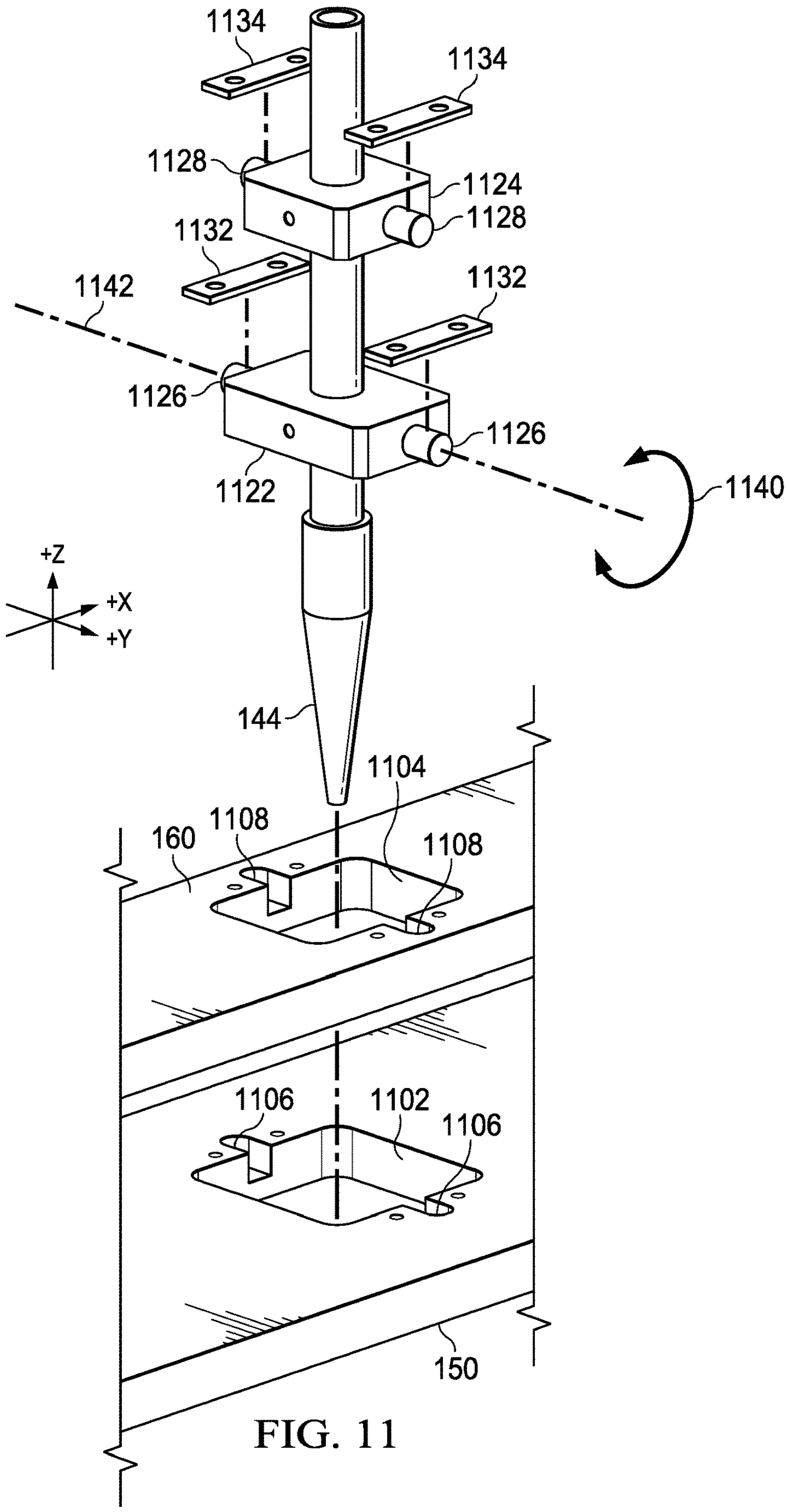
FIG. 11 is an exploded view of a nozzle and portions of the nozzle support plate and shaker bridge according to some examples.

FIG. 11 is an exploded view of a nozzle 144 and portions of the nozzle support plate 150 and shaker bridge 160 according to some examples. For each nozzle 144, the nozzle support plate 150 has a lower opening 1102, and the shaker bridge 160 has an upper opening 1104. Depressions 1106 extend from an upper surface of the nozzle support plate 150 into the nozzle support plate 150. The depressions 1106 adjoin the lower opening 1102, are centrally located with respect to an x-direction to the lower opening 1102, and extend in opposing directions from the lower opening 1102 aligned along a y-direction. Depressions 1108 extend from an upper surface of the shaker bridge 160 into the shaker bridge 160. The depressions 1108 adjoin the upper opening 1104, are centrally located with respect to an x-direction to the upper opening 1104, and extend in opposing directions from the upper opening 1104 aligned along a y-direction.

A lower block 1122 and an upper block 1124 are attached to the nozzle 144. Generally, when assembled, the lower block 1122 is disposed in the lower opening 1102 of the nozzle support plate 150, and the upper block 1124 is disposed in the upper opening 1104 of the shaker bridge 160. Roller pins 1126 extend in opposing directions from the lower block 1122 aligned along a y-direction. Roller pins 1128 extend in opposing directions from the upper block 1124 aligned along a y-direction. When assembled, the roller pins 1126 are seated in respective depressions 1106 and are secured in the depressions 1106 by brackets 1132 mechanically attached to the nozzle support plate 150. Similarly, when assembled, the roller pins 1128 are seated in respective depressions 1108 and are secured in the depressions 1108 by brackets 1134 mechanically attached to the shaker bridge 160. Generally, mechanically coupling the nozzle 144 to the nozzle support plate 150 and shaker bridge 160 in this manner fixes the nozzle 144 relative to the nozzle support plate 150 and shaker bridge 160 in a y-z plane and permits rotational movement of the nozzle 144 relative to the nozzle support plate 150 and shaker bridge 160 in an x-y plane. As illustrated, when assembled, the nozzle 144 is capable of rotational movement 1140 around an axis 1142 (e.g., along a y-direction) along which the roller pins 1126 are aligned. When assembled, the axis 1142 intersects the nozzle support plate 150, such as through the depressions 1106.

Referring to FIGS. 9 through 11 collectively, in operation, the motor 158 rotates its drive shaft, which causes the link screw 156 to rotate via the pulleys 918 and belt 920. Rotation of the link screw 156 causes the follower 910 to be translated along a y-direction, which further causes the first translation support bracket 912 and the nozzle support plate 150, and hence, the nozzles 144, to be translated along a y-direction.

Further, in operation, the motor 162 rotates its drive shaft, which causes the offset shaft 934 of the slider-crank linkage to rotate via the pulleys 936 and belt 938. Rotation of the offset shaft 934 includes an x-direction component and a y-direction component. Hence, the slider block 932 translates by the x-direction component and the y-direction component when the offset shaft 934 rotates. The slider of the slider block 932 and slider track 930 permits the slider block 932 to be translated in the y-direction component without substantial y-direction translation of the shaker bridge 160. The slider of the slider block 932 is capable of sliding along the slider track 930 to absorb the y-direction component of the translation of the slider block 932. The x-direction component of the translation of the slider block 932 is provided to the shaker bridge 160, via the slider of the slider block 932 and slider track 930 which substantially does not permit sliding in an x-direction, to translate the shaker bridge 160 along an x-direction. With the shaker bridge 160 being translated in an x-direction and the nozzle support plate 150 being fixed relative to an x-direction, the roller pins 1128 roll in the depressions 1108 while the shaker bridge 160 is translated, which causes the roller pins 1126 to roll in the depressions 1106. This action causes rotational movement 1140 of the nozzles around respective axes 1142.

Figure 12:
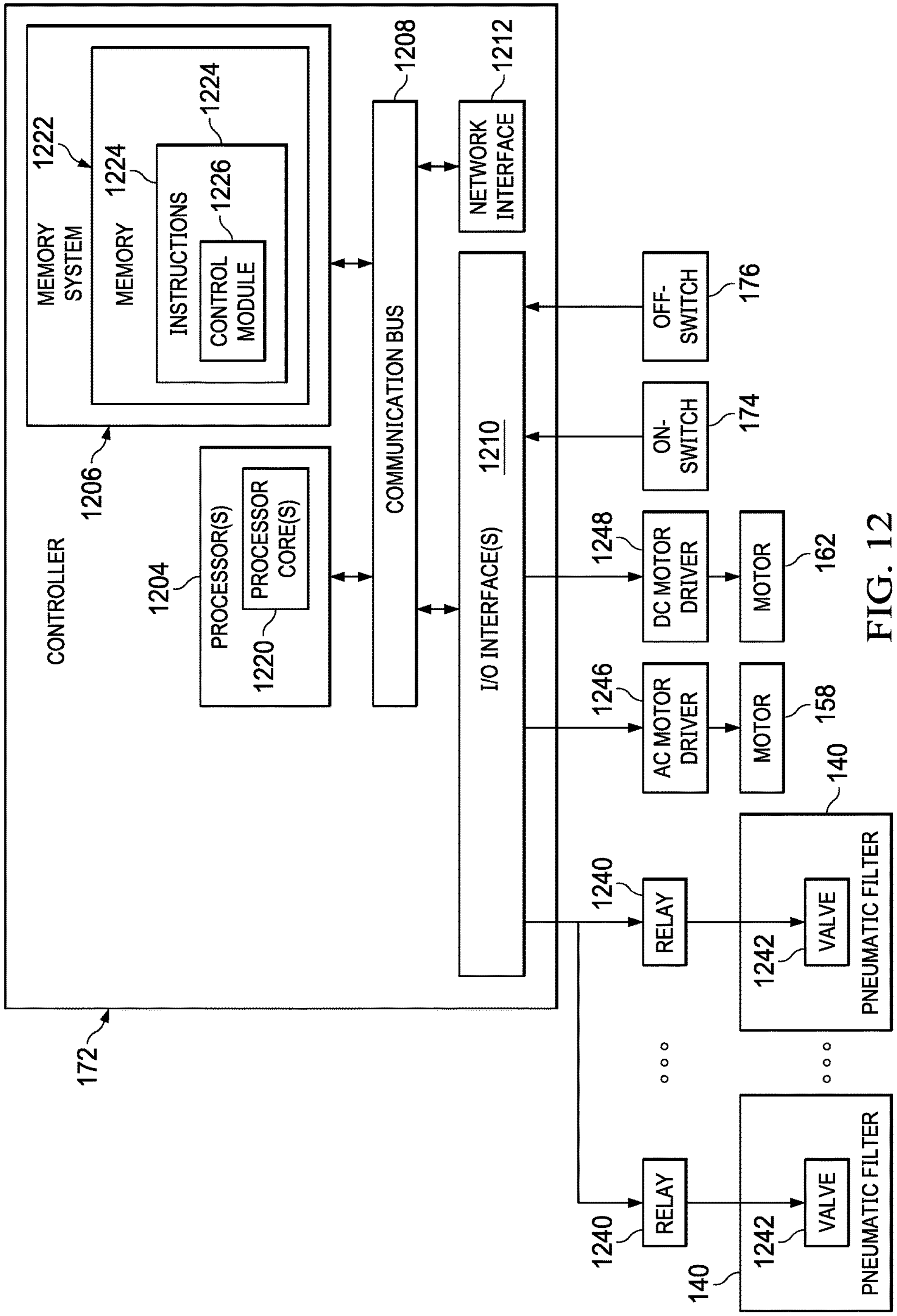
FIG. 12 is a simplified diagram of a control system of the electronic device peripheral cleaning cabinet according to some examples.

FIG. 12 is a simplified diagram of a control system of the electronic device peripheral cleaning cabinet 100 according to some examples. The control system includes a controller 172. An example controller 172 includes a CC3200 integrated circuit or a MSP432 integrated circuit, both available from Texas Instruments Incorporated.

The controller 172 includes one or more processors 1204, a memory system 1206, a communication bus 1208, one or more input/output (I/O) interfaces 1210, and a network interface 1212. Each processor 1204 can include one or more processor cores 1220. Each processor 1204 and/or processor core 1220 may be, for example, a central processing unit (CPU), a reduced instruction set computing (RISC) processor, a complex instruction set computing (CISC) processor, an application specific integrated circuit (ASIC), a field programmable gate array (FPGA), another processor, or any suitable combination thereof.

The memory system 1206 includes memory 1222. The memory 1222 may include any type of volatile or nonvolatile memory, such as dynamic random access memory (DRAM), static random access memory (SRAM), erasable programmable read-only memory (EPROM), electrically erasable programmable read-only memory (EEPROM), Flash memory, solid-state storage, etc. The memory 1222 is or includes one or more non-transitory storage media. Instructions 1224 are stored in the memory 1222. The instructions 1224 may be machine-executable code (e.g., machine code) and may comprise firmware, software, a program, an application, or other machine-executable code. The instructions 1224 can embody a software module, such as a control module 1226, which when executed by the one or more processors 1204, performs various functionality and methodologies as described herein. The memory system 1206 may include any appropriate memory controller for accessing memory 1222. A memory controller may be configured to control read and/or write access to a particular memory 1222 or subset of memory 1222.

The one or more I/O interfaces 1210 are configured to be electrically and/or communicatively coupled to one or more I/O devices. The I/O interfaces 1210 are electrically and/or communicatively coupled to relays 1240 that are intermediaries and isolation devices for pneumatic valves 1242 of the pneumatic filters 140. Signals can be sent from an I/O interface 1210 to the relays 1240, which in turn responsively send signals (e.g., higher voltage signals) to the pneumatic valves 1242 to cause the pneumatic valves 1242 to open or close. The I/O interfaces 1210 are electrically and/or communicatively coupled to an alternating current (AC) motor driver 1246 and a direct current (DC) motor driver 1248. Signals can be sent from an I/O interface 1210 to the AC motor driver 1246, which in turn responsively causes the motor 158 to cease rotation, rotate clockwise, or rotate counterclockwise. Signals can be sent from an I/O interface 1210 to the DC motor driver 1248, which in turn responsively causes the motor 162 to cease rotation or to rotate. The I/O interfaces 1210 are electrically and/or communicatively coupled to the on-switch 174 and the off-switch 176. An I/O interface 1210 can receive a signal from the on-switch 174 to initiate a cleaning procedure and can receive a signal from the off-switch 176 to interrupt or cease a cleaning procedure. Other I/O devices, such as sensors, a keyboard, a mouse, a display device, etc., may be communicatively coupled to the I/O interfaces 1210.

Although not illustrated, the network interface 1212 may be configured to be communicatively coupled to a network. The network interface 1212 can include circuitry for wired communication, such as an Ethernet connection, and/or can include circuitry for wireless communication, such as a circuitry for Wi-Fi® communications. Operation of the peripheral cleaning cabinet 100 can be monitored and/or controlled remotely via the network interface 1212.

The communication bus 1208 is communicatively connected to the one or more processors 1204, the memory system 1206, the one or more I/O interfaces 1210, and the network interface 1212. The various components can communicate between each other via the communication bus 1208. The communication bus 1208 can control the flow of communications, such as by including an arbiter to arbitrate the communications.

Figure 13:
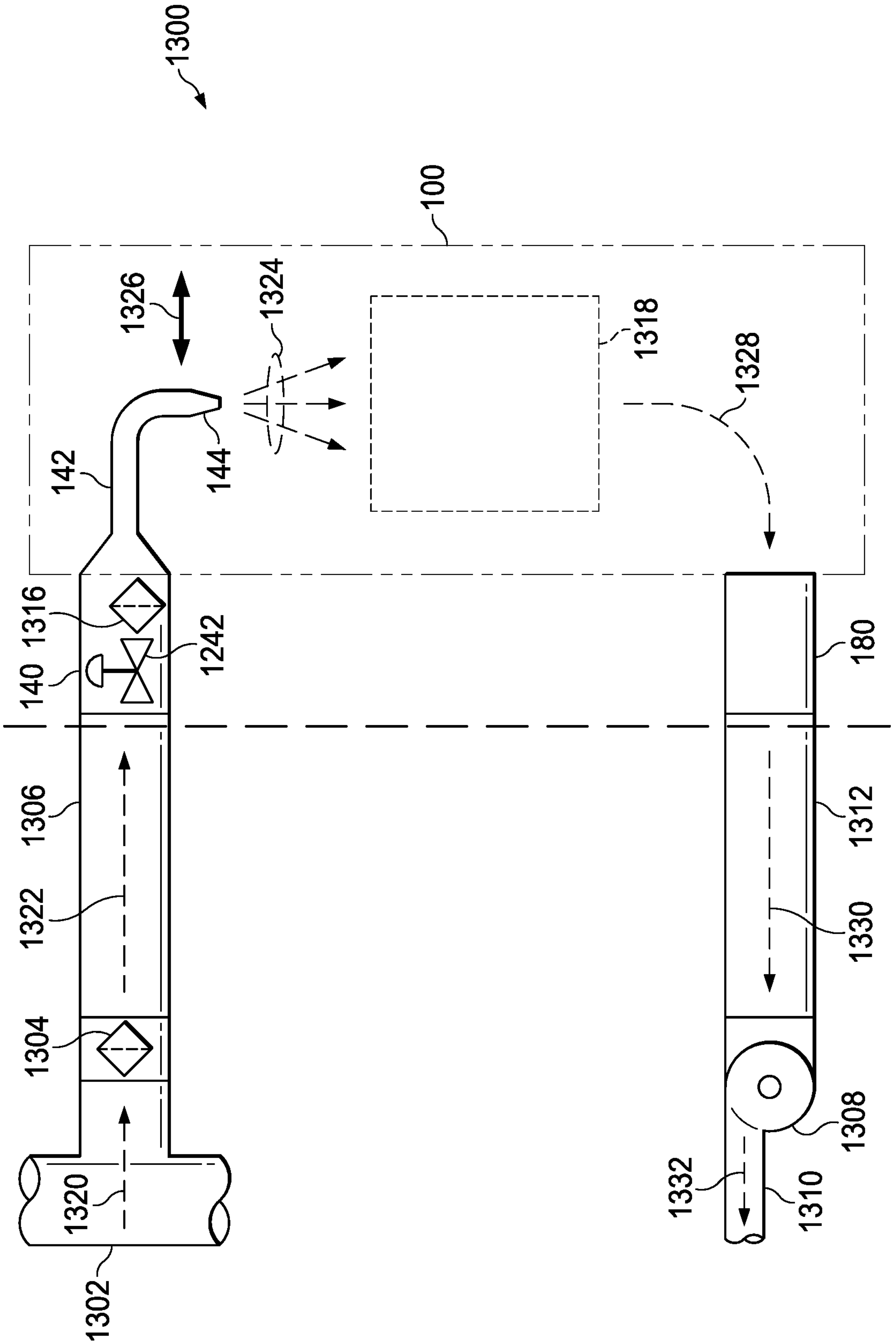
FIG. 13 is a simplified diagram illustrating aspects of cleaning electronic device peripherals using an electronic device peripheral cleaning cabinet according to some examples.

FIG. 13 is a simplified diagram illustrating aspects of cleaning electronic device peripherals using an electronic device peripheral cleaning cabinet 100 according to some examples. In FIG. 13, an electronic device peripheral cleaning cabinet 100 is fluidly coupled to facility side equipment 1300. The facility side equipment 1300 includes a gas supply trunk 1302, a gas filter 1304, a gas supply coupling 1306, an exhaust pump 1308, an exhaust port 1310, and exhaust coupling 1312.

Gas is maintained in the gas supply trunk 1302 at a pressure greater than ambient atmospheric pressure, such as equal to or greater than about 70 pounds per square inch (psi). The gas supplied by the gas supply trunk 1302 can be any appropriate gas, such as clean, dry air (CDA), an inert gas (such as nitrogen or argon), the like, or a combination thereof. CDA can have a composition like atmospheric air present in the facility and have equal to or less than 500 parts per million (ppm) of contaminants and not less than negative 50 degrees Celsius dew point.

The gas supply trunk 1302 is fluidly coupled to the gas filter 1304, and the gas filter 1304 is fluidly coupled to the gas supply coupling 1306. The gas supply coupling 1306 is fluidly coupled to the pneumatic filter 140, which includes a pneumatic valve 1242 and a gas filter 1316. In examples like illustrated, the gas filter 1316 may be redundant of the gas filter 1304, and hence, the gas filter 1316 may be omitted. In other configurations of an electronic device peripheral cleaning cabinet, the gas supply coupling 1306 may be fluidly coupled to an inlet port of the cabinet body 102.

The exhaust coupling 1312 is fluidly coupled to the exhaust port 180 of the cabinet body 102 of the peripheral cleaning cabinet 100. The exhaust pump 1308 is fluidly coupled to the exhaust coupling 1312 and is configured to reduce a pressure of gas in the exhaust coupling and exhaust the gas out the exhaust port 1310.

In the illustration of FIG. 13, a box 1318 generically illustrates electronic device peripherals loaded onto peripheral support walls 124, 126 that are support by wall support shelves 120. The electronic device peripherals loaded onto the peripheral support walls 124, 126 may or may not contain packaged semiconductor devices. Once the electronic device peripherals are loaded and the cabinet door 104 is secured to the cabinet body 102 in a closed position, a gas generally does not flow through the interior space of the cabinet body 102 while the pneumatic valve 1242 is in a closed position. When the pneumatic valve 1242 is in an opened position, gas flows from the gas supply trunk 1302 through the gas filter 1304 (as shown by gas flow 1320), through the gas supply coupling 1306 (as shown by gas flow 1322), and through a cabinet gas line of the electronic device peripheral cleaning cabinet 100. As indicated previously, the cabinet gas line includes a pneumatic filter 140, one or more hoses 142, and a nozzle 144. Gas flows through the pneumatic valve 1242 (in the open position) and gas filter 1316 of the pneumatic filter, through the one or more hoses 142, and out of the nozzle 144. The nozzle 144 can be moved 1326 as described previously such that gas is sprayed from the nozzle 144 at different locations and at different directions (as indicated by gas flow 1324).

The gas sprayed from the nozzle 144 can pass through the electronic device peripherals in box 1318 and can remove contaminants from the electronic device peripherals and any contents of the electronic device peripherals. The gas with any contaminants is exhausted through the exhaust port 180 of the cabinet body 102 (as indicated by gas flow 1328). The gas with any contaminants continues flowing through the exhaust coupling 1312 (as indicated by gas flow 1330) and out the exhaust port 1310 (as indicated by gas flow 1332). The pressure differential caused by maintaining a high pressure of the gas at the gas supply trunk 1302 and reducing pressure of the gas by the exhaust pump 1308 can help ensure flow of gas through the electronic device peripheral cleaning cabinet 100, e.g., without the electronic device peripheral cleaning cabinet 100 including an additional gas pump.

Figure 14:
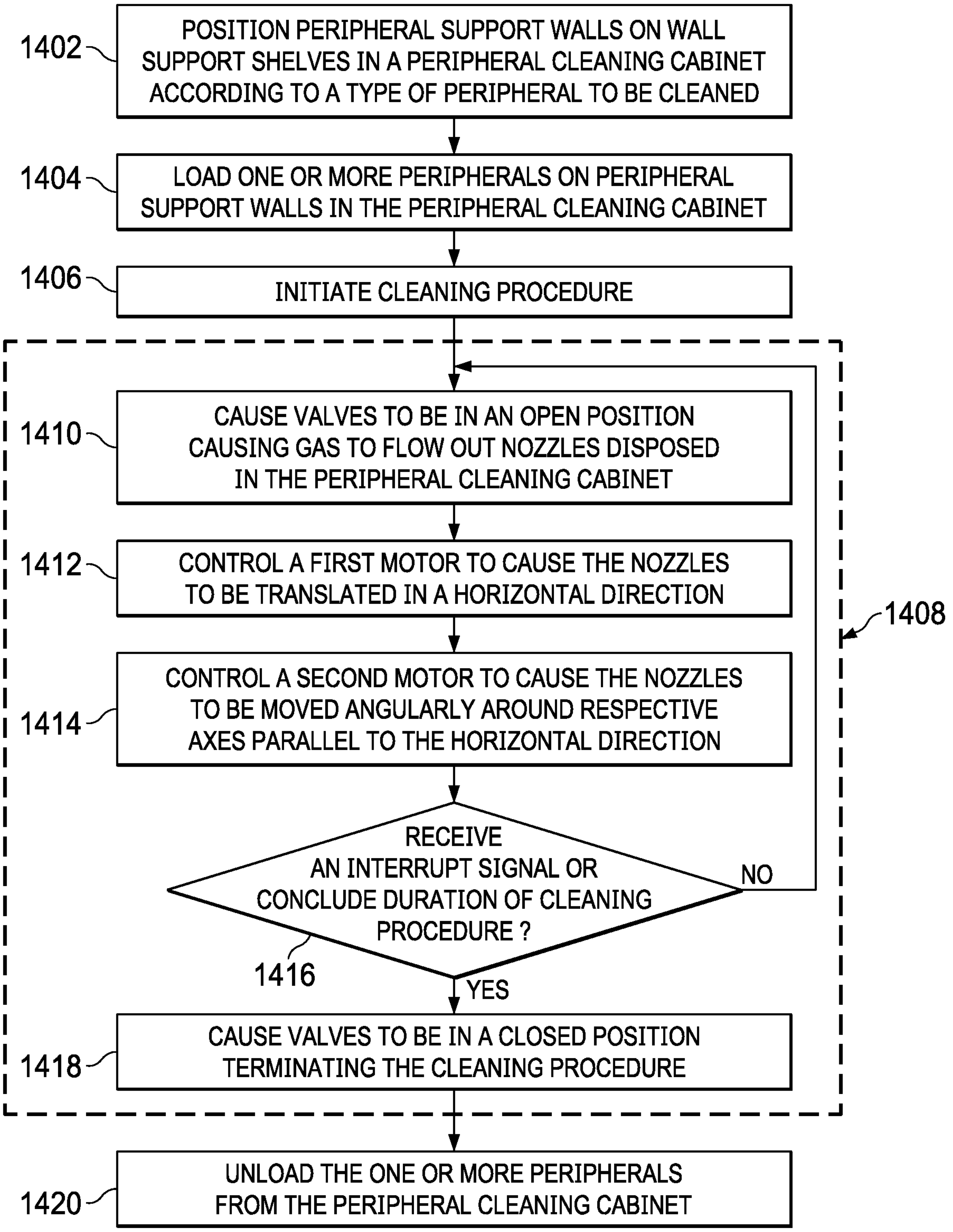
FIG. 14 is a flowchart of a method for cleaning electronic device peripherals according to some examples.

FIG. 14 is a flowchart of a method for cleaning electronic device peripherals according to some examples. At block 1402, peripheral support walls 124, 126 are positioned on wall support shelves 120 in an electronic device peripheral cleaning cabinet 100 according to a type of electronic device peripheral to be cleaned. For example, pairs of peripheral support walls 124, 126 can be positioned in respective wall insertion openings 202 of respective wall support shelves 120 and in appropriate first stabilizing slots 214, second stabilizing slots 216, and third stabilizing slots 222 to implement a target distance between the peripheral support walls 124, 126 for a given type of electronic device peripheral, as described previously.

At block 1404, one or more electronic device peripherals are loaded on peripheral support walls 124, 126 in the electronic device peripheral cleaning cabinet 100. For example, an electronic device peripheral can be placed on support rails 302, 304 of a lower pair of peripheral support walls 124, 126 and between respective lower portions of an upper pair of peripheral support walls 124, 126, as described previously. The one or more electronic device peripherals may or may not contain or support one or more packaged semiconductor device as loaded in the electronic device peripheral cleaning cabinet 100. The cabinet door 104 can then be secured in a closed position relative to the cabinet body 102.

At block 1406, a cleaning procedure is initiated. The cleaning procedure can be initiated by an operator pressing the on-switch 174, which causes the controller 172 to begin the cleaning procedure of block 1408. The cleaning procedure of block 1408 can be implemented by one or more processors 1204 of the controller 172 executing instructions 1224 that are stored in memory 1222 (e.g., by executing the control module 1226).

At block 1410, pneumatic valves 1242 of the pneumatic filters 140 are caused to be in an open position. In an open position, gas flows through the gas filter 1316 of the pneumatic filter 140, out the nozzles 144, through the electronic device peripherals, and out the exhaust port 180 as described previously. At block 1412, a motor 158 is controlled to cause the nozzles 144 to be translated in a horizontal direction (e.g., in a y-direction) as described previously). At block 1414, a motor 162 is controlled to cause the nozzles 144 to be moved angularly around respective axes parallel to the horizontal direction as described previously. Blocks 1412 and 1414 may be performed simultaneously while the pneumatic valves 1242 are in an open position.

At block 1416, a determination is made whether an interrupt signal has been received, such as from the off-switch 176, or a duration of the cleaning procedure has concluded. If not, the cleaning procedure continues by the repeated performance of blocks 1410-1416. If so, at block 1418, the pneumatic valves 1242 are caused to be in a closed position terminating the cleaning procedure. At block 1420, the electronic device peripherals are unloaded from the electronic device peripheral cleaning cabinet 100.

Although various examples have been described in detail, it should be understood that various changes, substitutions, and alterations can be made therein without departing from the scope defined by the appended claims.

What is claimed is:

1. A peripheral cleaning cabinet comprising:

a cabinet body comprising an exhaust port;

a door mechanically coupled to the cabinet body;

a cabinet gas line comprising a gas valve and a nozzle, the gas valve being fluidly coupled to the nozzle, the nozzle being disposed in the cabinet body, the cabinet gas line being configured to supply a gas to flow into the cabinet body; and a support shelf disposed in the cabinet body and configured to support a peripheral, the support shelf being configured to allow the gas to flow from the nozzle, through the support shelf, and to the exhaust port, and the support shelf comprising:

a wall support shelf having openings therethrough, the openings being configured to allow the gas that flows from the nozzle to the exhaust port to pass through the wall support shelf;

a first peripheral support wall having a first support rail disposed on a first surface of the first peripheral support wall; and a second peripheral support wall having a second support rail disposed on a second surface of the second peripheral support wall, wherein:

the wall support shelf is configured to mechanically support the first peripheral support wall and the second peripheral support wall;

the first surface of the first peripheral support wall and the second surface of the second peripheral support wall face each other; and the first support rail and the second support rail are configured to support the peripheral.

2. The peripheral cleaning cabinet of claim 1, wherein the cabinet gas line further comprises a gas filter.

3. The peripheral cleaning cabinet of claim 2, wherein the gas valve and the gas filter are components of a pneumatic filter.

4. The peripheral cleaning cabinet of claim 1, wherein the wall support shelf is configured to allow the first peripheral support wall, the second peripheral support wall, or a combination thereof to be horizontally repositioned along the wall support shelf.

5. The peripheral cleaning cabinet of claim 1, wherein the nozzle is moveable within the cabinet body.

6. The peripheral cleaning cabinet of claim 1, further comprising a nozzle support plate, the nozzle being mechanically coupled to the nozzle support plate, the nozzle support plate being configured to be translated in a first horizontal direction, the nozzle being configured to be translated in the first horizontal direction when the nozzle support plate is translated in the first horizontal direction.

7. The peripheral cleaning cabinet of claim 6, further comprising:

a link screw disposed in and mechanically coupled to the cabinet body;

a follower threadedly engaged with the link screw, the follower being mechanically attached to the nozzle support plate; and a motor disposed in and mechanically attached to the cabinet body, the motor being rotationally coupled to the link screw, wherein the motor and the link screw are configured such that operation of the motor causes rotation of the link screw, wherein the link screw and the follower are configured such that rotation of the link screw causes translation of the follower and the nozzle support plate in the first horizontal direction.

8. The peripheral cleaning cabinet of claim 6, further comprising a shaker bridge, the nozzle being mechanically coupled to the shaker bridge, the shaker bridge being configured to be translated in a second horizontal direction perpendicular to the first horizontal direction, the nozzle support plate being fixed relative to the second horizontal direction, the nozzle being moved angularly around the first horizontal direction when the shaker bridge is translated in the second horizontal direction.

9. The peripheral cleaning cabinet of claim 8, further comprising:

a motor disposed in the cabinet body and mechanically attached to the nozzle support plate; and a slider-crank linkage mechanically coupled to the shaker bridge, wherein the motor and the slider-crank linkage are configured such that operation of the motor causes rotation of the slider-crank linkage, wherein the slider-crank linkage and the shaker bridge are configured such that rotation of the slider-crank linkage causes translation of the shaker bridge in the second horizontal direction.

10. An electronic device peripheral cleaning cabinet comprising:

a cabinet body;

a door mechanically coupled to the cabinet body;

a gas delivery means for supplying a gas to an interior space of the cabinet body;

a peripheral support means for supporting a peripheral in the interior space of the cabinet body; and a nozzle movement means for moving a nozzle, wherein the gas delivery means comprises the nozzle, the nozzle being configured to flow the gas from the nozzle into the interior space of the cabinet body.

11. The electronic device peripheral cleaning cabinet of claim 10, wherein the nozzle movement means includes a nozzle translation means for translating the nozzle.

12. The electronic device peripheral cleaning cabinet of claim 10, wherein the nozzle movement means includes a nozzle angular rotation means for angularly rotating the nozzle.

13. A peripheral cleaning cabinet comprising:

a cabinet body comprising an exhaust port;

a door mechanically coupled to the cabinet body;

a cabinet gas line comprising a gas valve and a nozzle, the gas valve being fluidly coupled to the nozzle, the nozzle being disposed in the cabinet body, the cabinet gas line being configured to supply a gas to flow into the cabinet body;

a support shelf disposed in the cabinet body and configured to support a peripheral, the support shelf being configured to allow the gas to flow from the nozzle, through the support shelf, and to the exhaust port; and a nozzle support plate, the nozzle being mechanically coupled to the nozzle support plate, the nozzle support plate being configured to be translated in a first horizontal direction, the nozzle being configured to be translated in the first horizontal direction when the nozzle support plate is translated in the first horizontal direction.

14. The peripheral cleaning cabinet of claim 13, further comprising:

a link screw disposed in and mechanically coupled to the cabinet body;

a follower threadedly engaged with the link screw, the follower being mechanically attached to the nozzle support plate; and a motor disposed in and mechanically attached to the cabinet body, the motor being rotationally coupled to the link screw, wherein the motor and the link screw are configured such that operation of the motor causes rotation of the link screw, wherein the link screw and the follower are configured such that rotation of the link screw causes translation of the follower and the nozzle support plate in the first horizontal direction.

15. The peripheral cleaning cabinet of claim 13, further comprising a shaker bridge, the nozzle being mechanically coupled to the shaker bridge, the shaker bridge being configured to be translated in a second horizontal direction perpendicular to the first horizontal direction, the nozzle support plate being fixed relative to the second horizontal direction, the nozzle being moved angularly around the first horizontal direction when the shaker bridge is translated in the second horizontal direction.

16. The peripheral cleaning cabinet of claim 15, further comprising:

a motor disposed in the cabinet body and mechanically attached to the nozzle support plate; and a slider-crank linkage mechanically coupled to the shaker bridge, wherein the motor and the slider-crank linkage are configured such that operation of the motor causes rotation of the slider-crank linkage, wherein the slider-crank linkage and the shaker bridge are configured such that rotation of the slider-crank linkage causes translation of the shaker bridge in the second horizontal direction.

* * * * *